(12) United States Patent
Tamai et al.

(10) Patent No.: US 7,956,126 B2
(45) Date of Patent: Jun. 7, 2011

(54) STYRENE RESIN COMPOSITION AND PROCESS FOR PRODUCING THE SAME

(75) Inventors: Akiyoshi Tamai, Nagoya (JP); Shinichiro Ochiai, Nagoya (JP); Sadayuki Kobayashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 11/885,119

(22) PCT Filed: Feb. 27, 2006

(86) PCT No.: PCT/JP2006/303547
§ 371 (c)(1),
(2), (4) Date: Aug. 27, 2007

(87) PCT Pub. No.: WO2006/093068
PCT Pub. Date: Sep. 8, 2006

(65) Prior Publication Data
US 2008/0176999 A1 Jul. 24, 2008

(30) Foreign Application Priority Data

Feb. 28, 2005 (JP) ................. 2005-055179
Nov. 30, 2005 (JP) ................. 2005-344947

(51) Int. Cl.
*C08L 25/04* (2006.01)
*C08L 69/00* (2006.01)
*C08J 3/20* (2006.01)
*B29B 7/34* (2006.01)

(52) U.S. Cl. ............... 525/67; 525/63; 525/64; 525/65; 525/439; 525/69; 524/109

(58) Field of Classification Search ............ 525/63, 525/64, 65, 67, 69, 439; 524/109
See application file for complete search history.

(56) References Cited

U.S. PATENT DOCUMENTS

| 4,528,346 | A | * | 7/1985 | Sugie et al. ............ 525/523 |
| 4,735,978 | A | * | 4/1988 | Ishihara ............... 524/162 |
| 5,262,504 | A | * | 11/1993 | Tazaki et al. ........... 526/347 |
| 6,197,853 | B1 | * | 3/2001 | Bolton et al. ............ 524/108 |
| 6,472,460 | B1 | | 10/2002 | Okamoto et al. ........ 524/445 |
| 2002/0161111 | A1 | * | 10/2002 | Sawano ................ 525/67 |

FOREIGN PATENT DOCUMENTS

| EP | 0 422 239 A1 | 4/1991 |
| EP | 0 490 269 B1 | 2/1996 |
| EP | 0 893 476 A1 | 1/1999 |
| EP | 0 926 204 A1 | 6/1999 |
| EP | 1 069 156 A1 | 1/2001 |
| JP | 9-59464 A | 3/1997 |
| JP | 10-46019 A | 2/1998 |
| JP | 11-80287 A | 3/1999 |
| JP | 11-80470 A | 3/1999 |
| JP | 2001-131398 A | 5/2001 |
| JP | 2003-136526 A | 5/2003 |
| JP | 2003-286414 A | 10/2003 |
| JP | 2003-311448 A | 11/2003 |
| JP | 2004-210916 A | 7/2004 |
| JP | 2004210916 A * | 7/2004 |
| WO | 01/02474 A1 | 1/2001 |

OTHER PUBLICATIONS

Supplementary European Search Report in Appln. No. EP 06 71 4684.5, (PCT/JP2006/303547), dated Sep. 14, 2009.

* cited by examiner

*Primary Examiner* — Vasu Jagannathan
*Assistant Examiner* — Mark S Kaucher
(74) *Attorney, Agent, or Firm* — Kubovcik & Kubovcik

(57) ABSTRACT

A styrene-based resin composition that can be effectively used as a structural material owing to its excellent mechanical properties and also as a functional material owing to its excellent regularity and a method for manufacturing a styrene-based resin composition structurally controllable in nanometer order to micrometer order. The styrene-based resin composition includes (A) a styrene-based resin, (B) a thermoplastic resin other than a styrene-based resin, (c1) a modified styrene-based polymer and (c2) a polycarbonate-based graft polymer.

12 Claims, 4 Drawing Sheets

STYRENE RESIN COMPOSITION AND PROCESS FOR PRODUCING THE SAME

This application is a 371 of international application PCT/JP2006/303547, filed Feb. 27, 2006, which claims priority based on Japanese patent application Nos. 2005-055179 and 2005-344947 filed Feb. 28 and Nov. 30, 2005, respectively, each of which is incorporated herein by reference.

TECHNICAL FIELD

The present invention relates to a styrene-based resin composition that can be effectively used as a structural material owing to its excellent mechanical properties and also as a functional material owing to its excellent regularity. The invention also relates to a method for manufacturing a styrene-based resin composition structurally controllable in nanometer order to micrometer order.

BACKGROUND ART

Styrene-based resins are used in extensive fields including electric and electronic apparatuses, automobiles, machine parts, miscellaneous goods and other various applications owing to their excellent mechanical properties, moldability and appearance. However, since styrene-based resins are poor in impact strength and heat resistance, proposed are various techniques such as adding a soft ingredient like rubber for improving impact strength, and adding a resin having a high glass transition temperature or a crystalline resin for improving heat resistance.

Above all, as methods for improving the toughness and heat resistance of styrene-based resins, many polymer blends with polycarbonate resins are proposed. However, polymer blends consisting of styrene-based resins and polycarbonate resins have problems that the mechanical properties, moldability and appearance as features of styrene-based resins are lowered, since the miscibility between styrene-based resins and polycarbonate resins are low.

So, as methods for solving these problems, proposed are a method of adding an epoxy modified/acid modified diene-based block copolymer as a miscibilizing agent to a polycarbonate-based resin and a polystyrene-based resin (patent document 1), a method of adding a block or graft copolymer consisting of two or more of an aromatic vinyl monomer, carbonate monomer and acrylic monomer, to a syndiotactic polystyrene-based resin and an aromatic polycarbonate resin (patent document 2), a method of adding a graft copolymer having a multiphase structure consisting of polycarbonate-based resin segments and epoxy group-containing a vinyl-based polymer segment, to one or more of a polycarbonate-based resin, polyester-based resin, polyamide-based resin and polyarylene sulfide-based resin, and a styrene-based resin (patent document 3), and a method of adding a copolymer consisting of an aromatic vinyl having an intrinsic viscosity of 1.5 dl/g or more and a weight average molecular weight/number average molecular weight ratio of more than 3.0 and vinyl cyanide, to a thermoplastic resin such as a polycarbonate resin or polyester resin, for enhancing melt moldability. However, even if any of the resins obtained by the inventions described in these patent documents is melt-kneaded or melt-blended using an extruder or the like and subsequently molded by a general method such as injection molding or blow molding, the miscibility with the styrene-based resin is not sufficiently enhanced, and a regular wavelength of concentration fluctuation cannot be formed without giving any sufficient effect of improving toughness.

Furthermore, in the case where a styrene-based resin and a polycarbonate resin are alloyed, chemicals resistance declines, and as a method for preventing it, the amount of vinyl cyanide such as acrylonitrile is increased. However, this method causes such problems that the miscibility with the polycarbonate is lowered and further that the melt processability is also lowered. As methods for solving the problems, disclosed are a method in which the sequential amount of the three acrylonitrile molecules to be cyclized during melt processing is specified (patent document 5) and a method of adding two specific ABS-based resins different in the amount of vinyl cyanide, to a polycarbonate resin (patent document 6). However, the obtained resin compositions do not allow a sufficient chemicals resistance effect to be obtained unless the amount of vinyl cyanide in the composition is larger than a certain amount, and are also unsatisfactory in mechanical properties and moldability.

A polymer alloy consisting of two or more resins separated in phase by spinodal decomposition, having a co-continuous structure with a wavelength of concentration fluctuation of 0.01 to 1 μm or a dispersed structure with a distance between particles of 0.01 to 1 μm (patent document 7), is disclosed. However, the polymer alloy described in the patent document has said structure obtained by melt blending and subsequent special press molding, and if it is simply molded by a general molding method such as injection molding, the wavelength of concentration fluctuation becomes too large during molding, not allowing excellent physical properties obtained. Furthermore, said phase structure cannot be obtained stably.

In the case where a rubber as a component, another resin, filler and the like are added to a styrene-based resin for melt blending, there are such problems that the properties of the styrene-based resin are greatly lowered due to the miscibility between the components, dispersibility, thermal deterioration depending on conditions, etc. As methods for solving the problems, disclosed are a method in which a powdery thermoplastic resin containing a large amount of a rubber as a component is extruded as a strand to form grains using a single-screw extruder having an L/D of 7.8 to 16 and a screw compression ratio of 1.4 to 2, with the pressure difference between the tip of the extruder and the inlet to the die kept at 0.3 Pa or less, at a resin temperature of 120 to 160° C. immediately before the die portion and at a resin pressure of 1.0 to 3.0 MPa (patent document 8), and a method in which organophilic clay and a polymer are melt-blended with the reduced pressure on the resin kept in a certain range in a filled region and with the total shear strain and/or the total shear energy per unit area kept in a certain range (patent document 9). However, if the said manufacturing methods are used for the polymer alloy of the present application, homogeneous melt blending is difficult and the heat generation caused by a high resin pressure under high shear flow thermally deteriorates the polymer of the present application, to greatly lower the mechanical properties. So, it is desired to further improve the manufacturing methods.

Furthermore, proposed is a resin composition for plating, consisting of a polycarbonate resin and acrylonitrile-butadiene-styrene resin (hereinafter called ABS resin), wherein the weight average molecular weight of the acetone-soluble matter in the ABS is 100,000 or more and the vinyl cyanide monomer content in the acetone soluble matter is 15 to 32 wt % (patent document 10). However, said patent document does not describe at all about the improvement of mechanical properties, etc. using a miscibilizing agent. Further, it neither describes nor suggests that if a regular wavelength of concentration fluctuation is formed, excellent plating properties can be exhibited.

[Patent Document 1] European Patent No. 893476
[Patent Document 2] JP2004-210916A (Pages 2-3)
[Patent Document 3] JP11-080287A (Page 2)
[Patent Document 4] JP11-080470A (Pages 2 and 4)
[Patent Document 5] JP9-059464A (Pages 2 and 4-5)
[Patent Document 6] JP2001-131398A (Page 2)
[Patent Document 7] JP2003-286414A (Pages 2 and 15-17)
[Patent Document 8] JP2003-136526A (Page 2)
[Patent Document 9] U.S. Pat. No. 6,472,460
[Patent Document 10] JP10-046019A (Page 2)

DISCLOSURE OF THE INVENTION

Problem to be Solved by the Invention

The problem to be solved by this invention is to provide a styrene-based resin composition highly practical as a general molding material, which is excellent in mechanical properties, flowability, chemicals resistance and plating properties, can be easily made flame retardant, and can be molded into articles having the above-mentioned excellent performance, thereby solving the above-mentioned problems.

Means for Solving the Problems

The inventors studied intensively to solve the above-mentioned problems, and as a result, found that a resin composition containing (A) a styrene-based resin, (B) a thermoplastic resin other than styrene-based resins, (c1) a modified styrene-based polymer and (c2) a polycarbonate-based graft polymer can solve the above-mentioned problems. As a result, this invention has been completed.

That is, this invention provides:
(1) A styrene-based resin composition comprising (A) a styrene-based resin, (B) a thermoplastic resin other than styrene-based resins, (C1) a modified styrene-based polymer and (C2) a polycarbonate-based graft polymer.
(2) A styrene-based resin composition, according to (1), wherein the styrene-based resin (A) and the thermoplastic resin other than styrene-based resins (B) have a co-continuous structure with a wavelength of concentration fluctuation of 0.001 to 1 μm or a dispersed structure with a distance between particles of 0.001 to 1 μm.
(3) A styrene-based resin composition, according to (2), wherein the styrene-based resin (A) and the thermoplastic resin other than styrene-based resins (B) have a co-continuous structure with a wavelength of concentration fluctuation of 0.01 to 0.5 μm or a dispersed structure with a distance between particles of 0.01 to 0.5 μm.
(4) A styrene-based resin composition, according to (1), wherein the modified styrene-based polymer (c1) contains vinyl-based monomer units respectively containing at least one kind of a functional group selected from carboxyl group, hydroxyl group, epoxy group, amino group and oxazoline group.
(5) A styrene-based resin composition, according to (1), wherein the polycarbonate-based graft polymer (c2) contains a polycarbonate resin segment and a vinyl-based polymer segment.
(6) A styrene-based resin composition, according to (1), wherein the styrene-based resin (A) contains styrene-based monomer units respectively substituted by an alkyl group with 1 to 4 carbon atoms.
(7) A styrene-based resin composition, according to (1), wherein the thermoplastic resin other than styrene-based resins (B) is (b) a polycarbonate resin.
(8) A styrene-based resin composition, according to (7), wherein said polycarbonate resin (b) contains an aromatic copolymerized polycarbonate obtained by copolymerizing (b1) 2,2'-bis(4-hydroxyphenyl)propane and (b2) at least one bifunctional phenol-based compound selected from 2,2'-bis(4-hydroxy-3,5-dimethylphenyl)propane, 2,2'-bis(4-hydroxy-3,5-diethylphenyl)propane and 2,2'-bis(4-hydroxy-3,5-dipropylphenyl)propane.
(9) A styrene-based resin composition, according to (1), wherein the styrene-based resin (A) and the thermoplastic resin other than styrene-based resins (B) are a combination satisfying the following formula (1) specifying the ratio of the melt viscosities of the respective resins at the temperature T (° C.) satisfying the following formula (2).

$$a/b \geq 0.1 \tag{1}$$

$$180 \leq T \leq 300 \tag{2}$$

a: Melt viscosity of the styrene-based resin (A) (temperature T° C., shear rate 1000/sec) (Pa·s)
b: Melt viscosity of the thermoplastic resin other than styrene-based resins (B) (temperature T° C., shear rate 1000/sec) (Pa·s)
(10) A styrene-based resin composition, according to (1), wherein the styrene-based resin (A) contains (a1) 20 to 75 wt % of styrene-based monomer units, (a2) 25 to 60 wt % of vinyl cyanide-based monomer units, and (a3) 0 to 55 wt % of other vinyl-based monomer units copolymerizable with the foregoing (the total amount of (a1) through (a3) is 100 wt %).
(11) A method for manufacturing the styrene-based resin composition as set forth in any one of (1) through (10), comprising the step of melt-blending the styrene-based resin (A), the thermoplastic resin other than styrene-based resins (B), the modified styrene-based polymer (c1) and the polycarbonate-based graft polymer (c2).
(12) A method for manufacturing a styrene-based resin composition, according to (11), wherein said melt blending is performed with the resin pressure kept at 2.0 MPa or higher at least at one or more places in the melt blending space or temporarily during the melt blending period of time.
(13) A method for manufacturing a styrene-based resin composition, according to (11), wherein the components (A), (B), (c1) and (c2) are miscible under shear flow during said melt blending, and phase separation occurs under no shear flow after discharge.
(14) A molded article composed of the styrene-based resin composition as set forth in any one of (1) through (10).
(15) A molded article, according to (14), which is painted or plated.

Effects of the Invention

Since this invention controls the dispersed structure of a styrene-based resin composition, the resin composition obtained is excellent in mechanical properties, flowability, chemicals resistance and plating properties, can be easily made flame retardant, and can be molded into articles having the above-mentioned excellent performance, being highly practical as a general molding material.

THE BEST MODES FOR CARRYING OUT THE INVENTION

The resin composition of this invention is particularly explained below.

As the styrene-based resin (A) used in this invention, a resin obtained by polymerizing at least one styrene-based monomer can be used. Examples of the styrene-based resin (A) include polystyrene, styrene-acrylonitrile copolymer, rubber-modified styrene-based resins, polymer blends consisting of a rubber-modified styrene-based resin and polyphenylene oxide (modified polyphenylene oxide resins), etc.

A rubber-modified styrene-based resin can be obtained by polymerizing or copolymerizing (hereinafter called "(co)polymerizing") a styrene-based monomer such as styrene or α-methylstyrene or a monomer mixture consisting of the styrene-based monomer and a vinyl monomer copolymerizable with it usually in the presence of a rubbery polymer by such a method as block polymerization, block suspension polymerization, solution polymerization, precipitation polymerization or emulsion polymerization. A structure in which the (co)polymer containing the styrene-based monomer is grafted to the rubbery polymer, and a structure in which the (co)polymer containing the styrene-based monomer is non-grafted to the rubbery polymer, can be used.

Examples of the rubber-modified styrene-based resin include HIPS (high impact polystyrene), ABS resin, AAS resin (acrylonitrile-acrylic rubber-styrene copolymer), MBS resin (methyl methacrylate-butadiene rubber-styrene copolymer), AES resin (acrylonitrile-ethylene propylene rubber-styrene copolymer), etc.

Particularly suitable is a composition consisting of 5 to 100 parts by weight of a graft (co)polymer obtained by graft polymerizing 95 to 20 wt % of a monomer mixture consisting of a styrene-based monomer and another vinyl-based monomer copolymerizable with it to 5 to 80 wt % of a rubbery polymer, and 0 to 95 parts by weight of a styrene-based (co)polymer obtained by polymerizing a monomer mixture consisting of a styrene-based monomer and another vinyl-based monomer copolymerizable with it.

As said rubbery polymer, a rubbery polymer having a glass transition temperature of 0° C. or lower is suitable. Examples of it include diene-based rubbers such as polybutadiene, styrene-butadiene copolymer, acrylonitrile-butadiene copolymer, styrene-butadiene block copolymer and butyl acrylate-butadiene copolymer, acrylic rubbers such as polybutyl acrylate, polyisoprene, ethylene-olefin copolymers, ethylene-unsaturated carboxylic ester copolymers, ethylene-fatty acid vinyl copolymers, ethylene-propylene-diene ternary copolymers, etc. Among them, it is preferred to use polybutadiene or a butadiene copolymer.

As an example of the styrene-based monomer, styrene can be preferably used. However, in view of the enhancement of miscibility due to the decrease of free volume under shear flow during melt blending, it can preferably contain one or more styrene-based monomers substituted by an alkyl group with 1 to 4 carbon atoms. Examples of the styrene-based monomer substituted by an alkyl group with 1 to 4 carbon atoms include α-methylstyrene, p-methylstyrene, m-methylstyrene, o-methylstyrene, p-ethylstyrene, m-ethylstyrene, o-ethylstyrene, t-butylstyrene, etc. Especially α-methylstyrene, o-methylstyrene or t-butylstyrene can be preferably used.

As the monomer other than the styrene-based monomer, a vinyl cyanide-based monomer can be preferably used for the purpose of further improving impact strength and chemicals resistance, and a (meth) acrylic ester-based monomer can be preferably used for the purpose of improving toughness and color tone.

Examples of the vinyl cyanide-based monomer include acrylonitrile, methacrylonitrile, ethacrylylonitrile, etc. Especially acrylonitrile can be preferably used.

Examples of the (meth)acrylic ester-based monomer include methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, etc. Especially methyl methacrylate can be preferably used.

Furthermore, as required, another vinyl-based monomer, for example, an aromatic vinyl-based monomer other than the styrene-based monomer, such as vinyltoluene, or a maleimide-based monomer such as maleimide, N-methylmaleimide or N-phenylmaleimide, etc. can also be used.

It is preferred that the monomer or monomer mixture used in the above-mentioned graft (co)polymer contains 5 to 90 wt % of a styrene-based monomer in view of the impact strength of the resin composition. A more preferred range is from 10 to 80 wt %. In the case where a vinyl cyanide-based monomer is mixed, it is preferred that the amount of it is 1 to 60 wt % in view of the moldability of the resin composition. An especially preferred amount is 50 wt % or less. Especially in the case where chemicals resistance is required, it is preferred that the amount of it is in a range from 25 to 50 wt %, since chemicals resistance can be exhibited while the decline of impact strength and flowability can be inhibited. Furthermore, in the case where a (meth) acrylic ester-based monomer is mixed, it is preferred that the amount of it is 80 wt % or less in view of toughness and impact resistance. An especially preferred amount is 75 wt % or less. It is preferred that the total sum of the amounts of the aromatic vinyl-based monomer, the vinyl cyanide-based monomer and the (meth)acrylic ester-based monomer as the monomer or monomer mixture is 95 to 20 wt %. A more preferred range is from 90 to 30 wt %.

With regard to the mixing ratio of the rubbery polymer and the monomer mixture for obtaining the graft (co)polymer, it is preferred that the amount of the rubbery polymer is 5 wt % or more per 100 wt % of the entire graft (co)polymer in view of the impact strength of the resin composition. A more preferred amount is 10 wt % or more. Furthermore, in view of the impact strength of the resin composition and the appearance of the molded article, it is preferred that the amount of the rubbery polymer is 80 wt % or less, and more preferred is 70 wt % or less. Moreover, it is preferred that the mixing ratio of the monomer or the monomer mixture is 95 wt % or less, and more preferred is 90 wt % or less. Furthermore, preferred is 20 wt % or more, and more preferred is 30 wt % or more.

The graft (co)polymer can be obtained by a publicly known polymerization method. For example, a mixture consisting of a monomer and a chain transfer agent and a solution with a radical generating agent dissolved in an emulsifier can be continuously supplied into a polymerization vessel in the presence of a rubbery polymer latex, for performing emulsion polymerization, to obtain the graft (co)polymer.

The graft (co)polymer contains a graft (co)polymer having a structure in which a monomer or monomer mixture is grafted to a rubbery polymer, and also contains the (co)polymer not grafted. The graft rate of the graft (co)polymer is not especially limited, but to obtain a resin composition with impact strength and gloss in excellent balance, a range from 20 to 80% is preferred, and a range from 25 to 50% is especially preferred. In this case, the graft rate refers to a value calculated from the following formula:

Graft rate(%)=[(Amount of the vinyl-based copolymer graft-polymerized to the rubbery polymer)/(Rubber content of the graft copolymer)]×100

The properties of the (co)polymer not grafted are not especially limited, but a preferred condition for obtaining a resin composition with excellent impact strength is that the intrinsic viscosity [η] (measured at 30° C.) of the methyl ethyl ketone soluble matter is in a range from 0.25 to 1.00 dl/g. An especially preferred range is from 0.25 to 0.80 dl/g.

The styrene-based (co)polymer is a copolymer containing a styrene-based monomer as an essential component. A preferred example of the styrene-based monomer is styrene, but in view of the enhancement of miscibility due to the decrease of free volume under shear flow during melt blending, it can preferably contain one or more styrene-based monomers substituted by an alkyl group with 1 to 4 carbon atoms. Examples of the styrene-based monomer substituted by an alkyl group with 1 to 4 carbon atoms include α-methylstyrene, p-methylstyrene, m-methylstyrene, o-methylstyrene, p-ethylstyrene, m-ethylstyrene, o-ethylstyrene, t-butylstyrene, etc. Especially α-methylstyrene, o-methylstyrene or t-butylstyrene can be preferably used. One or more of them can be used.

As the monomer other than the aromatic vinyl-based monomer, a vinyl cyanide-based monomer can be preferably used for the purpose of further improving impact strength and chemicals resistance, and a (meth) acrylic ester-based monomer can be preferably used for the purpose of improving toughness and color tone.

Examples of the vinyl cyanide-based monomer include acrylonitrile, methacrylonitrile, ethacrylonitrile, etc. Especially acrylonitrile can be preferably used. Examples of the (meth)acrylic ester-monomer include methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, etc. Especially methyl methacrylate can be preferably used.

Furthermore, examples of the other vinyl-based monomer copolymerizable with them, used as required, include aromatic vinyl-based monomers other than styrene-based monomers, such as vinyltoluene, and maleimide-based monomers such as maleimide, N-methylmaleimide and N-phenylmaleimide.

In this invention, a styrene-based copolymer copolymerized with a maleimide-based monomer, i.e., a maleimide group-modified styrene-based copolymer can be preferably used, since the maleimide group-modified styrene-based copolymer contained in the polystyrene-based resin can improve the heat resistance of the resin composition and can also specifically improve flame retardancy.

It is preferred that the rate of the styrene-based monomer as a component of the styrene-based (co)polymer is 5 to 90 wt % based on the weight of all the monomers in view of the impact strength of the resin composition. A more preferred range is from 10 to 80 wt %. In the case where a vinyl cyanide-based monomer is mixed, it is preferred that its amount is 1 to 60 wt % in view of impact strength and flowability. A more preferred range is 50 wt % or less. Especially in the case where chemicals resistance is necessary, it is preferred to keep its amount in a range from 25 to 50 wt %, since chemicals resistance can be exhibited while the decline of impact strength and flowability can be inhibited. Furthermore, in the case where a (meth)acrylic ester-based monomer is mixed, it is preferred that its amount is 80 wt % or less in view of toughness and impact strength. A more preferred range is 75 wt % or less. Further, in the case where another vinyl-based monomer copolymerizable with them is mixed, it is preferred that its amount is 60 wt % or less, and an especially preferred range is 50 wt % or less.

The properties of the styrene-based (co)polymer are not especially limited, but it is preferred that the intrinsic viscosity [η] of the styrene-based (co)polymer measured using methyl ethyl ketone as a solvent at 30° C. is in a range from 0.25 to 5.00 dl/g, especially 0.35 to 3.00 dl/g, since a resin composition having excellent impact strength and moldability can be obtained.

The method for manufacturing the styrene-based (co)polymer is not especially limited, and an ordinary method such as block polymerization, suspension polymerization, emulsion polymerization, solution polymerization, block-suspension polymerization or solution-block polymerization cab be used.

For improving the chemicals resistance of the styrene-based resin composition of this invention, it is preferred to use a composition consisting of 20 to 75 wt % of styrene-based monomer units (a1), 25 to 60 wt % of vinyl cyanide-based monomer units (a2) and 0 to 55 wt % of other vinyl-based monomer units copolymerizable with them (a3) as the styrene-based resin (A). If the styrene-based resin (A) used is large in the content of vinyl cyanide-based monomer units like this, especially even in the case where the amount of all the vinyl cyanide-based monomer units is small (the added amount of the styrene-based resin is small) in the styrene-based resin composition, a co-continuous structure or dispersed structure of 1 μm or less can be established as a fine phase structure, to improve the chemicals resistance. Since the chemicals resistance can be improved without adding an excessive amount of vinyl cyanide-based monomer units to the composition like this, the usual decline of melt processability and mechanical strength caused by the amount of the vinyl cyanide-based monomer can be preferably greatly inhibited.

The thermoplastic resin other than styrene-based resins (B) of this invention is a thermoplastic resin capable forming the phase structure specified in this invention in cooperation with the styrene-based resin. Examples of the thermoplastic resin include polyesters, polyamides, polyphenylene oxide, polysulfones, polyethylene tetrafluoride, polyetherimides, polyamideimides, polyimides, polycarbonates, polyethersulfones, polyetherketones, polythioetherketones, polyetheretherketones, epoxy resins, phenol resins, polyethylene, polypropylene, polyphenylene sulfide, polyamide elastomers, polyester elastomers, polyalkylene oxides, resins such as olefin-based copolymers containing carboxyl groups, etc. Preferred are polyesters, polyamides and polycarbonates, and among them, for higher impact strength and heat resistance, it is most effective to contain a polycarbonate resin.

The polycarbonate resin can be selected from aromatic homopolycarbonates and aromatic copolycarbonates. Methods for manufacturing them include a phosgene method in which phosgene is blown into a bifunctional phenol-based compound in the presence of a caustic alkali and a solvent, and an ester interchange method in which a bifunctional phenol-based compound and diethyl carbonate are interesterified in the presence of a catalyst. As said aromatic polycarbonate, a polycarbonate having a viscosity-average molecular weight in a range from 10,000 to 100,000 is suitable. Examples of the bifunctional phenol-based compound include 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl)cyclohexane, 1-phenyl-1,1'-bis(4-hydroxyphenyl)ethane, etc. In view of the enhancement of miscibility due to the decrease of free volume under shear flow during melt blending, it is preferred to contain 2,2'-bis(4-hydroxy-3,5-dimethylphenyl)propane, 2,2'-bis(4-hydroxy-3,5-diethylphenyl)propane or 2,2'-bis(4-hydroxy-3,5- dipropylphenyl)propane. In this invention, one of the bifunctional phenol-based compounds can be used, or they can also be used together.

In the alloying between the styrene-based resin (A) and the polycarbonate resin, the phase structure of the resin composition can be controlled by lessening the difference in melt viscosity between them, or decreasing the content of the vinyl cyanide (a2), or using a copolymerized polycarbonate together with said bifunctional phenol-based compound, etc. Furthermore, if a phase diagraph showing the relation between the resin composition and the temperature described later is prepared beforehand, the structure control range can be easily known.

Furthermore, in the case where the styrene-based resin (A) and the polycarbonate resin are alloyed, it is preferred that the amount of the polycarbonate resin (b) is in a range from 20 to 70 wt %. A more preferred range is from 25 to 60 wt %, and an especially preferred range is from 30 to 50 wt %, for such reasons that a co-continuous structure can be relatively easily obtained and that the resin composition can be excellent in mechanical properties, flowability, chemicals resistance and plating properties and can be made easily flame retardant. In the conventional resin compositions, unless the polycarbonate resin is rich, the impact strength is low. However, in this invention, even if the amount of the polycarbonate resin is 30 wt %, high impact strength can be achieved. So, compared with the conventional composition rich in polycarbonate resin content, the composition of this invention can be remarkably improved in flowability, chemicals resistance and plating properties.

A polyester resin can be a one obtained by condensing an aromatic dicarboxylic acid or any of its esters or any of its ester forming derivatives and a diol by a publicly known method, and an aromatic polyester, total aromatic polyester, liquid crystal polyester, etc. can be used. Examples of the aromatic dicarboxylic acid include naphthalenedicarboxylic acids such as naphthalene-2,6-dicarboxylic acid, terephthalic acid, isophthalic acid, p-hydroxybenzoic acid, etc. Their ester forming derivatives can also be used to produce the polyester resin. Examples of the diol include polymethylene glycols having 2 to 6 carbon atoms such as ethylene glycol, 1,4-butanediol and 1,6-hexadiol, 1,4-cyclohexanediol, bisphenol A and their ester forming derivatives.

Preferred examples of the polyester resin include polyethylene terephthalate (PET), polybutylene terephthalate (PBT), polybisphenol A isophthalate, etc. As the polyester resin, a polyester resin with an intrinsic viscosity [η] of 0.4 to 2 dl/g at 25° C. in o-chlorophenol solvent is preferred. A polyester resin with an intrinsic viscosity of 0.6 to 1.5 is more preferred.

In the alloying between the styrene-based resin (A) and the polyester resin, if the molecular weights of both are lowered, the miscible range expands, and a desired phase structure can be easily obtained.

As the polyamide resin, for example, a polyamide resin produced by condensing a diamine and a dicarboxylic acid and a polyamide resin produced by a ring-opening polymerization of a lactam can be usually used. Preferred examples of the polyamide resin include nylon 6,6, nylon 6,9, nylon 6,10, nylon 6,12, nylon 6, nylon 12, nylon 11, nylon 4,6, etc. Furthermore, copolyamides such as nylon 6/6,6, nylon 6/6,10, nylon 6/12, nylon 6/6,12, nylon 6/6,6,10 and nylon 6/6,6/12 can also be used. Moreover, semi-aromatic polyamides obtained from an aromatic dicarboxylic acid such as nylon 6/6,T (T: terephthalic acid component), terephthalic acid or isophthalic acid and metaxylylenediamine or alicyclic diamine, and polyesteramides can also be used. As the polyamide resin, a polyamide resin with a relative viscosity [ηrel] of 1.0 to 4.0 measured in 90% formic acid solvent at a concentration of 1 g/100 cc at a temperature of 25° C. is preferred. A polyamide resin with a relative viscosity of 1.5 to 3.5 is more preferred. Any one of the polyamide resins can be used, or two or more of them can also be used as a mixture.

In the alloying between the styrene-based resin (A) and the polyamide resin, if the vinyl cyanide content in the styrene-based resin is increased, for example, to make the solubility parameters (SP) of both the resins close to each other, the miscible range can be expanded, and the desired phase structure can be easily obtained.

The proportions of the resin components constituting the styrene-based resin composition in this invention are not especially limited, but it is usually preferred to use 10 to 95 wt % of the styrene-based resin (A) per 100 wt % in total of the styrene-based resin (A) and the thermoplastic resin other than styrene-based resins (B). A more preferred range is from 15 to 85 wt %. An especially preferred range is from 20 to 80 wt %, since the co-continuous structure can be relatively easily obtained.

For the styrene-based resin composition of this invention, it is important to use the modified styrene-based polymer (c1) and the polycarbonate-based graft polymer (c2) together.

As the modified styrene-based polymer (c1), a styrene-based polymer containing vinyl-based monomer units respectively containing at least one kind of a functional group selected from carboxyl group, hydroxyl group, epoxy group, amino group and oxazoline group {hereinafter abbreviated as the modified styrene-based polymer (c1)} can be used. The modified styrene-based polymer (c1) does not contain the polycarbonate resin segment contained in the polycarbonate-based graft polymer (c2) described below.

The modified styrene-based polymer (c1) has a structure obtained by polymerizing one styrene-based monomer or copolymerizing two or more vinyl-based monomers including a styrene-based monomer, and is a polymer containing at least one kind of functional groups selected from carboxyl groups, hydroxyl groups, epoxy groups, amino groups and oxazoline groups in the molecule. The content of the compound containing the functional groups is not especially limited, but it is especially preferred that the amount of the compound is 0.01 to 20 parts by weight per 100 parts by weight of the modified styrene-based polymer.

The method for introducing carboxyl groups into the modified styrene-based polymer (c1) is not especially limited. Usable methods include a method of copolymerizing a vinyl-based monomer having a carboxyl group or anhydrous carboxyl group such as acrylic acid, methacrylic acid, maleic acid, monoethyl maleate, maleic anhydride, phthalic acid or itaconic acid with a predetermined vinyl-based monomer, a method of (co)polymerizing a predetermined vinyl-based monomer using a polymerization initiator having a carboxyl group such as γ,γ'-azobis(γ-cyanovaleric acid) or α,α'-azobis(α-cyanoethyl)p-benzoic acid or succinic acid peroxide and/or a polymerization degree adjusting agent having a carboxyl group such as thioglycollic acid, α-mercaptopropionic acid, β-mercaptopropionic acid, α-mercapto-isobutyric acid or 2,3- or 4-mercaptobenzoic acid, a method of saponifying using an alkali, a copolymer obtained from a (meth) acrylic ester-based monomer such as methyl methacrylate or methyl acrylate and a predetermined vinyl-based monomer, and as required a vinyl cyanide-based monomer, etc.

The method for introducing said hydroxyl groups is not especially limited either. For example, usable is a method in which a vinyl-based monomer having a hydroxyl group such as 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, or 4,4-dihydroxy-2-butene is copolymerized with a predetermined vinyl-based monomer.

The method for introducing said epoxy groups is not especially limited either. For example, usable is a method in which a vinyl-based monomer having an epoxy group such as glycidyl acrylate, glycidyl methacrylate, glycidyl ethacrylate, glycidyl itaconate, allyl glycidyl ether, styrene-p-glycidyl ether or p-glycidylstyrene is copolymerized with a predetermined vinyl-based monomer.

Above all, an epoxy-modified styrene-based polymer obtained by introducing epoxy groups by copolymerizing glycidyl methacrylate can be preferably used, since in the case where it is contained in the polystyrene-based resin, the resin composition of this invention can be improved in impact strength and can be easily made flame retardant.

The method for introducing said amino groups is not limited either. For example, usable is a method in which a vinyl-based monomer having an amino group or any of its derivatives such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine or p-aminostyrene is copolymerized with a predetermined vinyl-based monomer.

The method for introducing said oxazoline groups is not especially limited. For example, usable is a method in which a vinyl-based monomer having an oxazoline group such as 2-isopropenyl-oxazoline, 2-vinyl-oxazoline, 2-acryloyl-oxazone or 2-styryl-oxazoline is copolymerized with a predetermined vinyl-based monomer.

The properties of the modified styrene-based polymer (c1) are not especially limited, but a modified styrene-based polymer having an intrinsic viscosity [η] kept in a range of 0.25 to 5.00 dl/g, especially 0.35 to 3.00 dl/g measured using methyl ethyl ketone as a solvent at 30° C. is preferred, since a resin composition with excellent impact strength and moldability can be obtained.

The method for manufacturing the modified styrene-based polymer (c1) is not especially limited, and an ordinary method such as block polymerization, suspension polymerization, emulsion polymerization, solution polymerization, block-suspension polymerization or solution-block polymerization can be used.

Furthermore, as the polycarbonate-based graft polymer (c2) used in this invention, a polycarbonate-based graft polymer consisting of a polycarbonate resin segment and a vinyl-based polymer segment is preferred. A graft polymer having a multiphase structure in which the polycarbonate resin segment forms a continuous phase while the vinyl-based polymer segment forms a dispersed phase {hereinafter abbreviated as the polycarbonate-based graft polymer (c2)} is preferred.

As the polycarbonate resin forming the polycarbonate resin segment in the polycarbonate-based graft polymer (c2), any of all the polycarbonate resins exemplified for the thermoplastic resin other than styrene-based resins (B) can be used.

Furthermore, as the vinyl-based polymer forming the vinyl-based polymer segment in the polycarbonate-based graft polymer (c2), any of all the vinyl-based monomers exemplified for the styrene-based resin (A) and the modified styrene-based polymer (c1) can be used.

The polycarbonate-based graft polymer (c2) can be produced by a method comprising the steps of adding a vinyl-based monomer, radical copolymerizable organic peroxide and radical polymerization initiator to an aqueous suspension of a polycarbonate-based resin, heating under such a condition that no decomposition of the radical polymerization initiator occurs substantially, to make the polycarbonate-based resin impregnated with said vinyl-based monomer, radical copolymerizable organic peroxide and radical polymerization initiator, then raising the temperature of the aqueous suspension, to copolymerize the vinyl-based monomer and the radical copolymerizable organic peroxide in the polycarbonate-based resin, and melt-blending the produced graft polymer precursor at 100 to 350° C., to obtain the polycarbonate-based graft polymer (c2).

Examples of the polycarbonate-based graft polymer (c2) include PC-g-SAN (polycarbonate-graft-styrene/acrylonitrile copolymer, for example, "Modiper CH430" produced by NOF Corporation) obtained by graft-polymerizing a monomer mixture consisting of styrene and acrylonitrile to a polycarbonate resin, PC-g-PS (polycarbonate-graft-polystyrene, for example, "Modiper CL130D" produced by NOF Corporation) obtained by graft-polymerizing styrene monomer to a polycarbonate resin, PC-g-mSAN (polycarbonate-graft-modified styrene/acrylonitrile copolymer, for example, "Modiper CL440G" produced by NOF Corporation) obtained by graft-polymerizing a monomer mixture consisting of styrene, acrylonitrile and a functional group-modified vinyl to a polycarbonate resin, etc.

If the modified styrene-based polymer (c1) and the polycarbonate-based graft polymer (c2) are added together, the free energy at the interface between separated phases can be lowered, and hence the wavelength of concentration fluctuation of the co-continuous structure or the distance between particles of the dispersed structure can be easily controlled to improve the mechanical properties and the like of the resin composition.

It is preferred that the added amount of both the modified styrene-based polymer (c1) and the polycarbonate-based graft polymer (c2) is in a range from 0.2 to 40 parts by weight per 100 parts by weight in total of the components (A) and (B). A more preferred range is from 0.5 to 35 parts by weight, and an especially preferred range is from 1 to 30 parts by weight. Since the added amount is 0.2 part by weight or more, the effect as miscibilizing agents can be exhibited for allowing the wavelength of concentration fluctuation or the distance between particles to be controlled. Furthermore, it is preferred that the added amount is 40 parts by weight or less, since the flowability and residence stability of the resin composition can be maintained.

Furthermore, the addition ratio of the modified styrene-based polymer (c1) to the polycarbonate-based graft polymer (c2) is (c1):(c2)=99:1 to 1:99 (ratio by weight). A preferred range is from 99:1 to 10:90 (ratio by weight). An especially preferred range is 99:1 to 20:80 (ratio by weight). It is preferred that the addition ratio is kept in this range, since the excellent effect as miscibilizing agents can be obtained for allowing the wavelength of concentration fluctuation or the distance between particles to be controlled.

In this invention, since the modified styrene-based polymer (c1) and the polycarbonate-based graft polymer (c2) are added, the styrene-based resin composition can have a co-continuous structure with a wavelength of concentration fluctuation of 0.001 to 1 μm or a dispersed structure with a distance between particles of 0.001 to 1 μm, and can exhibit excellent mechanical properties, flowability and plating properties.

In order to obtain a resin composition with such a wavelength of concentration fluctuation, it is preferred that the styrene-based resin (A), the thermoplastic resin other than styrene-based resins (B), and the modified styrene-based polymer (c1) and the polycarbonate-based graft polymer (c2) are once dissolved to form a structure by the spinodal decomposition described later. Furthermore, to realize the formation of this structure, it is preferred that the styrene-based resin (A) and the thermoplastic resin other than styrene-based resins (B) form a partial miscible system, or a shear induced phase-dissolved/phase-decomposed system, or a reaction induced phase-decomposed system respectively described later.

In general, a polymer alloy consisting of two resins can form a miscible system in which both the components are miscible with each other in the entire practical temperature range from the glass transition temperature to the thermal decomposition temperature, or on the contrary an immiscible system in which both the components are immiscible with each other in the entire practical temperature range, or a partial miscible system in which both the components are miscible with each other in a certain temperature range and immiscible in the other temperature range. The partial miscible system includes a case where the polymer alloy is separated in phase by the spinodal decomposition and a case where it is separated in phase by nucleation and growth.

Furthermore, a polymer alloy consisting of three or more components can form a miscible system in which the three or more components are miscible with each other, or an immiscible system in which the three or more components are immiscible with each other, or an immiscible system in which a phase consisting of two or more components miscible with each other is immiscible with the other phase consisting of remaining one or more components, or a partial miscible system in which a phase consisting of two components partially miscible with each other has the remaining component distributed in it, etc. The polymer alloy consisting of three or more components preferred in this invention is a partial miscible system in which a phase consisting of two components partially miscible with each other has the remaining component distributed in it. The structure of the polymer alloy in this case can be expressed as a structure of a partially miscible system consisting of two components. So, a polymer alloy consisting of two resins is typically explained below.

The phase separation caused by the spinodal decomposition refers to the phase separation caused in the unstable state inside the spinodal curve in a phase diagram showing the relation between the composition ratio of two different resins contained as components and the temperature. On the other hand, the phase separation caused by nucleation and growth refers to the phase separation caused in the metastable state inside the binodal curve and outside the spinodal curve in the phase diagram.

The spinodal curve refers to the curve drawn in the relation between the composition ratio and the temperature, at which curve the result ($\delta 2\Delta Gmix/\delta\phi 2$) obtained by twice partially differentiating the difference ($\Delta Gmix$) between the free energy in the case where two different resins mixed as components are miscible, and the total of the free energies in immiscible two phases, with respect to the concentration ($\phi$), is 0. Inside the spinodal curve, an unstable state of $\delta 2\delta Gmix/\Delta\phi 2<0$ occurs, and outside the spinodal curve, $\delta 2\Delta Gmix/\delta\phi 2>0$ occurs.

The binodal curve refers to the curve at the boundary between a miscible system region and an immiscible system region in the relation between the composition ratio and the temperature.

The miscible state in this invention refers to a state where the components are homogeneously mixed on the molecular level. Particularly, it refers to a case where the two phases, each containing a different resin as a main component, do not form a phase structure of 0.001 μm or more respectively. Furthermore, an immiscible state refers to a state other than the miscible state. That is, it refers to a state where the two phases, each containing a different resin as a main component, form a phase structure of 0.001 μm or more respectively. Being miscible or not can be judged using an electron microscope or differential scanning calorimeter (DSC) or any of various other methods, for example, as described in "Polymer Alloys and Blends, Leszek A. Utracki, Hanser Publishers, Munich Viena New York, P. 64".

According to the detailed theory, in spinodal decomposition, in the case where the temperature of a mixture system made homogeneously miscible once at a temperature of a miscible range is quickly changed to a temperature of an unstable range, the system quickly initiates phase separation toward an equilibrium concentration. In this case, the concentration is made monochromatic into a certain wavelength, and a co-continuous structure, in which both the separated phases are continuously and regularly entangled with each other at a wavelength of concentration fluctuation ($\Lambda m$), is formed. After this co-continuous structure is formed, while the wavelength of concentration fluctuation is kept constant, only the difference between the concentrations of both the phases increases. This stage is called the early stage of spinodal decomposition.

The wavelength of concentration fluctuation ($\Lambda m$) in the above-mentioned early stage of spinodal decomposition has thermodynamically the following relation.

$$\Lambda m \sim [|Ts-T|/Ts]^{-1/2} \text{ (where Ts is the temperature on the spinodal curve)}$$

The spinodal decomposition that has undergone the early stage as described above reaches the intermediate stage where the increase of wavelength and the increase of concentration difference occur simultaneously. After the concentration difference has reached the equilibrium concentration, the increase of wavelength occurs as if to follow autosimilarity in the late stage. After undergoing this stage, the spinodal decomposition progresses till finally the separation into two macroscopic phases occurs. For obtaining the structure specified in this invention, it is only required to fix the structure in the stage where a desired wavelength of concentration fluctuation has been reached before the final separation into two macroscopic phases occurs.

Furthermore, in the stage where the wavelength increases from the intermediate stage to the late stage, it can happen that one phase becomes discontinuous due to the influence of the composition ratio or interfacial tension, to change from the aforesaid co-continuous structure to the dispersed structure. In this case, it is only required to fix the structure in the stage where a desired distance between particles has been reached.

The co-continuous structure refers to a structure in which both the resins mixed as components form continuous phases respectively and are three-dimensionally entangled with each other. A typical view of the co-continuous structure is described, for example, in "Polymer Alloys: Foundation and Applications (second edition) (Chapter 10.1) (in Japanese)" (Edited by the Society of Polymer Science, Japan: Tokyo Kagaku Dojin).

Furthermore, the dispersed structure refers to a so-called sea-isles structure in which particles containing one resin as a main component are dispersed in a matrix containing the other resin as a main component.

The styrene-based resin composition that can be obtained in this invention is controlled to have a co-continuous structure with the wavelength of concentration fluctuation kept in a range from 0.001 to 1 μm or a dispersed structure with the distance between particles kept in a range from 0.001 to 1 μm. For obtaining more excellent mechanical properties, it is preferred to control for having a co-continuous structure with the wavelength of concentration fluctuation kept in a range from 0.01 to 0.5 μm or a dispersed phase with the distance between particles kept in a range from 0.01 to 0.5 μm, and it is more preferred to control for having a co-continuous structure with the wavelength of concentration fluctuation kept in a range from 0.01 to 0.4 μm or a dispersed phase with the distance between particles kept in a range from 0.01 to 0.4 μm. For obtaining very excellent properties, it is most preferred to control for having a co-continuous structure with the wavelength of concentration fluctuation kept in a range from 0.01 to 0.3 μm or a dispersed structure with the distance between particles kept in a range from 0.01 to 0.3 μm. If the wavelength of concentration fluctuation or the distance between particles is controlled to be kept in such a range, a structure having excellent mechanical properties, flowability, plating properties and flame retardancy as intended effects of this invention can be effectively obtained.

On the other hand, in the nucleation and growth as the phase separation in the above-mentioned metastable region, a sea-isles structure as a dispersed structure is formed from the early stage, and since the structure grows, it is difficult to form the regularly arranged co-continuous structure with the wavelength of concentration fluctuation kept in a range from 0.001 to 1 μm or the regularly arranged dispersed structure with the distance between particles kept in a range from 0.001 to 1 μm as in this invention.

To confirm the co-continuous structure or dispersed structure formed due to the spinodal decomposition, it is important to confirm a regular periodical structure. For this purpose, for example, the structure is observed with an optical microscope or transmission electron microscope, to confirm that a co-continuous structure is formed, and in addition, a light scattering instrument or small-angle X-ray scattering instrument is used for scattering measurement to confirm that a scattering maximum appears. Meanwhile, since the light scattering instrument and the small-angle X-ray scattering instrument are different in optimum measuring range, the instrument with a measuring range suitable for the wavelength of concentration fluctuation should be selected. The existence of a scattering maximum in scattering measurement proves that a regularly phase-separated structure with a certain period exists. The period Λm corresponds to the wavelength of concentration fluctuation in the case of co-continuous structure, and corresponds to the distance between particles in the case of dispersed structure. The value can be calculated from the following formula using the wavelength λ of scattered light in a scattering body and the scattering angle θm giving the scattering maximum:

$$\Lambda m=(\lambda/2)/\sin(\theta m/s)$$

To induce the spinodal decomposition, it is necessary to once make the styrene-based resin and the thermoplastic resin other than styrene-based resins miscible with each other and then to arrive at the unstable state inside the spinodal curve.

The methods for making the two or more resins contained as components miscible with each other include a solvent casting method and a melt blending method. A solvent casting method refers to a method in which after dissolving into a common solvent, the solution is transformed into a film or the like by means of spray drying, freeze drying, solidification in a non-solvent substance or solvent evaporation. A melt blending method refers to a method in which resins of a partially miscible system are melt-blended to be made miscible with each. Among them, a melt blending method that is a dry process free from the use of any solvent can be practically preferably used.

For making the resins miscible with each other by melt blending, an ordinary extruder can be used, but it is preferred to use a twin-screw extruder. Furthermore, depending on the combination of resins, they may be made miscible with each other in the plasticization step of an injection molding machine. It is necessary that the temperature for making the resins miscible with each other is a temperature at which the resins of a partial miscible system can be made miscible with each other.

When the resin composition made miscible by said melt blending is brought into the unstable state inside the spinodal curve for spinodal decomposition, the temperature and other conditions for bringing the resin composition into the unstable state cannot be generally specified, since they are different depending on the combination of resins. However, they can be set by carrying out a simple preliminary experiment based on phase diagrams.

Methods for fixing the structural product obtained by spinodal decomposition include a method of fixing the structure of one or both the components corresponding to the phases separated in a short period of time by quick cooling or the like, a method of fixing one component, if it is a thermosetting resin, using the phenomenon that the phase of the thermosetting resin becomes immovable due to a reaction, and a method of fixing a crystalline resin phase by crystallizing it for making it immovable.

In this invention, in order to separate the styrene-based resin (A) and the thermoplastic resin other than styrene-based resins (B) in phase by said spinodal decomposition, for obtaining the styrene-based resin composition of this invention, it is preferred to combine a styrene-based resin and the other resin to ensure that a partial miscible system, or a shear induced phase-dissolved/phase-decomposed system, or a reaction induced phase-decomposed system can be formed, as described before.

As partial miscible systems of a composition, known are a system with a low temperature miscible type phase diagram, which is likely to be made miscible in a low temperature range, and on the contrary, a system with a high temperature miscible type phase diagram, which is likely to be made miscible in a high temperature range. The lowest temperature among the temperatures demarcating between a miscible zone and an immiscible zone in the low temperature miscible type phase diagram is called the lower critical solution temperature (LCST), and the highest temperature among the temperatures demarcating between a miscible zone and an immiscible zone in the high temperature miscible type phase diagram is called the upper critical solution temperature (UCST).

In the case of a low temperature miscible type phase diagram, if the two or more resins contained as components made miscible from a partially miscible system are brought to a temperature higher than the LCST and inside the spinodal curve, spinodal decomposition can be induced. In the case of a high temperature miscible type phase diagram, if they are brought to a temperature lower than the UCST and inside the spinodal curve, spinodal decomposition can be induced.

Furthermore, in addition to the spinodal decomposition in the partial miscible system, spinodal decomposition can also be induced by melt blending even in an immiscible system. For example, even the so-called shear induced phase dissolution/phase decomposition, in which the resins are made miscible with each other once under shear flow during melt blending or the like and brought into the unstable state again under no shear flow to cause phase decomposition, allows the phase separation by spinodal decomposition. Also in this case, as in the case of partial miscible system, the decomposition of spinodal decomposition type progresses to form a regular co-continuous structure. Moreover, in this shear induced phase dissolution/phase decomposition, the spinodal curve changes depending on the shear field, to expand the unstable state region. So, compared with the method by the temperature change of the partial miscible system where no spinodal curve changes, the substantial supercooling degree (|Ts−T|) becomes large even with the same temperature change width. As a result, the wavelength of concentration fluctuation in the early stage of spinodal decomposition in the above-mentioned formula can be easily lessened preferably. For making the resins miscible with each other under shear flow during melt blending as described above, an ordinary extruder can be used, but it is preferred to use a twin-screw extruder. Furthermore, depending on the combination of resins, the resins may also be made miscible with each other in the plasticization step of an injection molding machine. In this case, the temperature for making the resins miscible with each other, the heat treatment temperature for realizing the early stage, the heat treatment temperature for coarsening from the early stage and other conditions are different depending on the combination of resins and cannot be generally specified. However, the conditions can be set by carrying out a simple preliminary experiment based on the phase diagrams prepared under various shear conditions. Furthermore as a preferred method for reliably making the resins miscible with each other in said plasticization step of an injection molding machine, for example, the resins are melt-blended using a twin-screw extruder for being made miscible with each other, and the blend is discharged and quickly cooled in ice water or the like for having its structure fixed in the miscible state, before it is injection-molded.

Furthermore, it is preferred to add a copolymer such as a block copolymer, graft copolymer or random copolymer respectively containing the components constituting the polymer alloy, as a third component, to the styrene-based resin composition of this invention, for such reasons that the free energy at the interface between the separated phases can be lowered and that the wavelength of concentration fluctuation in the co-continuous structure or the distance between particles in the dispersed structure can be easily controlled. In this case, since the third component such as a copolymer is usually distributed into the respective phases of the polymer alloy consisting of two resins contained as components excluding the third component, the polymer alloy obtained can be handled like the polymer alloy consisting of two resins contained as components.

It is preferred that the styrene-based resin composition of this invention is such that the styrene-based resin (A) and the thermoplastic resin other than styrene-based resins (B) are a combination satisfying the following formula (1) specifying the ratio of the melt viscosities of the respective resins at the temperature T (° C.) satisfying the following formula (2), in order to stably obtain the above-mentioned specific phase-separated structure under practical molding conditions.

$$a/b \geq 0.1 \quad (1)$$

$$180 \leq T \leq 300 \quad (2)$$

a: Melt viscosity of the styrene-based resin (A) (temperature T° C., shear rate 1000/sec) (Pa·s)

b: Melt viscosity of the thermoplastic resin other than styrene-based resins (B) (temperature T° C., shear rate 1000/sec) (Pa·s)

(In the above, the melt viscosity is a value measured by capillography with such measuring conditions as the temperature, shear rate and orifice kept the same, and the measuring temperature is the temperature at which the respective components and other additives are blended.)

With regard to the ratio (a/b) of the melt viscosity of the styrene-based resin (A) to the melt viscosity of the thermoplastic resin other than styrene-based resins (B), the upper limit is not especially limited if the phase structure of this invention can be obtained. It is preferred that the ratio is in a range from 0.1 to 10, and a more preferred range is from 0.1 to 7. An especially preferred range is from 0.1 to 5, since the co-continuous structure is likely to be more stably obtained.

The method for adjusting the melt viscosity of each component is not especially limited. Examples of the method include (a) a method of adjusting to achieve the intended melt viscosity by hydrolysis, (b) a method of using a polymer with such a molecular weight as to achieve the intended melt viscosity, (c) a method of adjusting to achieve the intended melt viscosity by mixing polymers different in molecular weight, (d) a method of mixing an optional additive to achieve the intended melt viscosity, etc.

The styrene-based resin composition of this invention can be obtained by melt-blending said components (A), (B), (c1) and (c2), but it is preferred that the melt blending is performed with the resin pressure kept at 2.0 MPa or higher.

In the manufacturing method of this invention, the resin pressure refers to a resin pressure in gauge pressure measured by a resin pressure gauge attached to the melt blending apparatus.

Said resin pressure during melt blending is not required to be consistently kept at 2.0 MPa or higher, and it is only required that the resin pressure is kept at 2.0 MPa or higher at least at one or more places in the melt blending space or temporarily during the melt blending period of time. In the case where an extruder is used for melt blending, it is preferred that the resin pressure is kept at 2.0 mPa or higher at the place where the resin pressure becomes usually highest. For example, it is preferred that the resin pressure is kept at 2.0 MPa or higher at the place where the resins are retained by a reversely full-flighted screw or kneading block.

In this invention, when the styrene-based resin (A) and the thermoplastic resin other than styrene-based resins (B) are melt-blended, it is only required that the resin pressure is kept at 2.0 MPa or higher at least at one or more places in the melt blending space. In the melt blending apparatus, since the resin pressure tends to be high at the place where the resins are retained by a reversely full-flighted screw or kneading block, the resin pressure can be measured at such a place, and melting blending can be performed under such a condition as to keep the resin pressure at the place at 2.0 MPa or higher. Furthermore, in this invention, it is only necessary that the resin pressure is kept at 2.0 MPa or higher temporarily during the melt blending period of time. It is preferred that the period of time during which the resin pressure is kept at 2.0 MPa or higher is 1 second or more, and if the resins are retained for 1 second or more at the place where the resins are retained by a reversely full-flighted screw or kneading block, the resin pressure is kept at 2.0 MPa or more temporarily. It is more preferred that the resin pressure is kept at 2.0 MPa or higher for about 5 seconds to about 5 minutes.

The resin pressure during melt blending is not especially limited if it is kept at 2.0 mPa or higher as far as the mechanical performance allows it. However, a preferred range is from 2.0 to 10.0 MPa, and a more preferred range is from 2.0 to 7.0 MPa. An especially preferred range is from 2.0 to 5.0 MPa, since the co-continuous structure is likely to be more stably obtained while the deterioration of resins can be kept small. The resin pressure is, for example, the value indicated in gauge pressure by a resin pressure gauge installed at an optional barrel portion such as a full-flighted screw, kneading block, the place upstream of the discharge port or the like.

The method for adjusting the resin pressure during melt blending is not especially limited. Examples of the method include (a) improving the resin viscosities by lowering the melt blending temperature, (b) selecting the polymers with molecular weights capable of achieving the intended resin pressure, (c) retaining the resins by changing the screw arrangement by introducing a reversely full-flighted screw or kneading block, (d) raising the polymer filling rate in the barrel, (e) raising the rotating speed of the screw, (f) enhancing the resin viscosities by mixing an optional additive, (g) achieving a supercritical state, for example, by introducing carbonic acid gas, etc.

When the styrene-based resin composition of this invention is melt-blended, it is preferred to adjust the resin pressure for keeping it at 2.0 MPa or higher, preferably in a range from 2.0 to 10.0 MPa in reference to the balance with the barrel temperature, rotating speed of screw, raw material feed rate (filling rate) and resin temperature.

The styrene-based resin composition of this invention can have the above-mentioned specific co-continuous structure with a wavelength of concentration fluctuation of 0.001 to 1 µm or more or the above-mentioned specific dispersed structure with a distance between particles of 0.001 to 1 µm or more stably by practical molding, and can exhibit an effect of easily having mechanical properties, flowability, plating properties and flame retardancy {the limit oxygen index (LOI) measured according to JIS K 7021} without impairing the excellent mechanical properties, moldability and appearance of the styrene-based resin.

Furthermore, the styrene-based resin composition of this invention can be easily made flame retardant by adding a flame retarder. The flame retarder used in this invention is not especially limited, and it can be a general flame retarder. As the flame retarder, usable are a phosphorus-based compound, a halogen-based organic compound, further, a nitrogen-containing organic compound such as melamine, an inorganic compound such as magnesium oxide or aluminum hydroxide, a polyorganosiloxane-based compound, a metal oxide such as arsenic oxide, antimony oxide, bismuth oxide, iron oxide, zinc oxide or tin oxide, silica, etc. It is preferred to use a phosphorus-based compound or halogen-based organic compound, or to use a halogen-based organic compound and antimony oxide together. Especially preferred is a phosphorus-based compound.

The phosphorus-based compound is not especially limited, if it is an organic or inorganic compound containing phosphorus. Examples of it include polyammonium phosphate, polyphosphazenes, phosphates, phosphonates, phosphinates, phosphine oxide, etc. Among them, polyphosphazenes and phosphates are preferred. An aromatic phosphate can be especially preferably used.

The content of the phosphorus-based compound is generally in a range from 0.1 to 30 parts by weight per 100 parts by weight in total of the components (A) and (B). A preferred range is from 0.5 to 25 parts by weight, and an especially preferred range is from 1 to 20 parts by weight. It is not preferred that the content is less than 0.1 part by weight, since the necessary flame retardant effect cannot be exhibited, and it is not preferred either that the content is more than 30 parts by weight, since the mechanical strength and heat resistance of the resin composition are greatly lowered.

Examples of the halogen-based organic compound include hexachloropentadiene, hexabromodiphenyl, octabromodiphenyl oxide, tribromophenoxymethane, decabromodiphenyl, decabromodiphenyl oxide, octabromodiphenyl oxide, tetrabromobisphenol A, tetrabromophthalimide, hexabromobutene, trichlorotetrabromophenyl-triphosphate, hexabromocyclododecane, and compounds obtained by modifying these compounds using various substituent groups.

The content of the halogen-based organic compound is generally in a range from 0.1 to 30 parts by weight per 100 parts by weight in total of the components (A) and (B). A preferred range is from 0.5 to 25 parts by weight, and an especially preferred range is from 1 to 20 parts by weight. It is not preferred that the content is less than 0.1 part by weight, since the necessary flame retarding effect cannot be exhibited, and it is not preferred either that the content is more than 30 parts by weight, since the mechanical strength of the resin composition is greatly lowered.

If a dropping preventive is used together with the flame retarder in the resin composition of this invention, it is effective for enhancing the flame retardancy. Examples of the dropping preventive include perfluoroalkane polymers such as polytetrafluoroethylene, silicone rubber, graft polymers obtained by graft-polymerizing these polymers by a vinyl-based compound, high molecular weight vinyl-based copolymers such as high molecular weight acrylonitrile-styrene and high molecular weight PMMA, glass fibers, carbon fibers, etc. Especially acryl-modified polytetrafluoroethylene can be preferably used.

It is preferred that the content of the dropping preventive is in a range from 0.01 to 5 parts by weight per 100 parts by weight in total of components (A) and (B). An especially preferred range is from 0.05 to 3 parts by weight. It is not preferred that the content is less than 0.01 parts by weight, since the dropping preventive effect during burning is not sufficient, not allowing high flame retardancy to be obtained. It is not preferred either that the content is more than 5 parts by weight, since flowability and mechanical strength such as stiffness are lowered.

Moreover in this invention, to further improve the strength, dimensional stability, and so on, a filler can be used as required. The form of the filler can be either fibrous or non-fibrous, and a fibrous filler and a non-fibrous filler can also be used in combination. Such fillers include fibrous fillers such as glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers and metal fibers, and non-fibrous fillers, for example, silicates such as wollastonite, zeolite, sericite, kaolin, mica, clay, pyrophyllite, bentonite, asbestos, talc and alumina silicate, metal compounds such as alumina, silicon oxide, magnesium oxide, zirconium oxide, titanium oxide and iron oxide, carbonates such as calcium carbonate, magnesium carbonate and dolomite, sulfates such as calcium sulfate and barium sulfate, hydroxides such as magnesium hydroxide, calcium hydroxide and aluminum hydroxide, glass beads, ceramic beads, boron nitride, silicon carbide, etc. They can be hollow, and two or more of these fillers can also be used together. It is preferred that these fibrous and/or non-fibrous fillers are preliminarily treated with a coupling agent such as an isocyanate-based compound, organic silane-based compound, organic titanate-based compound, organic borane-based compound or epoxy compound, since more excellent mechanical strength can be obtained.

In the case where such a filler is used to improve strength, dimensional stability, and so on, the amount is not especially limited, but is usually 0.1 to 200 parts by weight per 100 parts by weight in total of the components (A) and (B).

To the styrene-based resin composition of this invention, ordinary additives can be added to such an extent that the effect of this invention is not impaired. The additives include a plasticizer such as a polyalkylene oxide oligomer-based compound, thioether-based compound, ester-based compound or organic phosphorus compound, crystal nucleating agent such as talc, kaolin, organic phosphorus compound or polyether ether ketone, releasing agent such as a polyolefin-based compound, silicone-based compound, long chain aliphatic ester-based compound or long chain aliphatic amide-based compound, anticorrosive, coloration preventive, antioxidant, thermal stabilizer, lubricant such as lithium stearate or aluminum stearate, ultraviolet light preventive, colorant, foaming agent, etc.

These additives can be mixed at any desired stage while the styrene-based resin composition of this invention is manufactured. For example, such methods as a method of adding simultaneously when at least two resins used as components are mixed, a method of adding after two resins used as components have been melt-blended, and a method of adding at first to either of the resins, melt-blending and mixing the remaining resin can be used.

The styrene-based resin composition obtained in this invention can be molded by any desired method into any desired form. Examples of the molding method include injection molding, extrusion molding, inflation molding, blow molding, etc. Above all, injection molding is preferred since the heat treatment and structural fixing can be performed simultaneously in the mold after injection. Furthermore, film and/or sheet extrusion molding is preferred, for such reasons that heat treatment can be performed during the stretching of the film and/or sheet and that the structure can be fixed during natural cooling before winding. It is of course possible to separately heat-treat the article molded as described above, for forming the structure.

The styrene-based resin composition of this invention can be effectively used as a structural material owing to its excellent impact strength, heat resistance, flowability, plating properties and flame retardancy, and can be suitably used, for example, as electric/electronic parts, automobile parts, mechanical parts, housings of OA apparatuses, household electric appliances, etc. and their parts, miscellaneous goods, etc.

Molded articles of the styrene-based resin composition of this invention can be used, for example, as electric/electronic parts such as various gears, various cases, sensors, LED lamps, connectors, sockets, resistors, relay cases, switches, coil bobbins, capacitors, variable capacitor cases, optical pickups, vibrators, various terminal boards, transformers, plugs, printed wiring boards, tuners, speakers, microphones, headphones, small motors, magnetic head bases, power modules, housings, semiconductors, liquid crystals, FDD carriages, FDD chassis, motor brush holders, parabolic antennas, and computer-related parts; household and office use electric product parts such as generators, motors, transformers, current transformers, voltage regulators, rectifiers, inverters, relays, power contacts, switches, circuit breakers, knife switches, multipolar rods, electric machine parts and cabinets, VTR parts, TV parts, irons, hair dryers, rice boiler parts, electronic oven parts, audio apparatus parts including acoustic parts, audio laser discs, compact discs and DVDs, lighting parts, refrigerator parts, air conditioner parts, typewriter parts, and word processor parts, machine related parts such as office computer related parts, telephone set related parts, cellular phone related parts, facsimile related parts, copier related parts, washing tools, various bearings including oilless bearings, stern bearings and submerged bearings, motor parts, lighters, and typewriters, optical apparatuses such as microscopes, binoculars, cameras and watches, precision machine related parts; automobile parts such as alternator terminals, alternator connectors, IC regulators, light deer potentiometer bases, air intake nozzle snorkels, intake manifolds, air flow meters, air pumps, fuel pumps, engine cooling water joints, thermostat housings, carburetor main bodies, carburetor spacers, engine mounts, ignition bobbins, ignition cases, clutch bobbins, sensor housings, idle speed control valves, vacuum switching valves, ECU housings, vacuum pump cases, inhibitor switches, rotation sensors, acceleration sensors, distributor caps, coil bases, ABS actuator cases, radiator tank tops and bottoms, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes relating to fuel, exhaust, intake, etc., various tanks, various hoses relating to fuel, exhaust, intake, etc., various clips, various valves including exhaust gas valves, various pipes, exhaust gas sensors, cooling water sensors, oil temperature sensors, brake pad wear sensors, throttle position sensors, crankshaft position sensors, air conditioner thermostat bases, air conditioner panel switchboards, heating air flow control valves, radiator motor brush holders, water pump impellers, turbine vanes, wiper motor related parts, step motor rotors, brake pistons, solenoid bobbins, engine oil filters, igniter cases, torque control levers, starter switches, starter relays, safety belt parts, register blades, washer levers, window regulator handles, window regulator handle knobs, passing light levers, distributors, sun visor brackets, various motor housings, automotive exterior materials including roof rails, fenders, garnishes, bumpers, door mirror stays, horn terminals, window washer nozzles, spoilers, hood louvers, wheel covers, wheel caps, radiator grills, grill apron cover frames, lamp reflectors, lamp sockets, lamp housings, lamp bezels and door handles, automotive interior materials including center consoles, instrument panels, instrument panel cores, instrument panel pads, globe boxes, handle columns, arm rests, parking brake levers, front pillar trims, door trims, pillar trims and console boxes, various connectors including wire harness connectors, SMJ connectors, PCB connectors, door grommet connectors and fuse connectors; electric/electronic apparatus parts and machine parts such as housings of storage devices like personal computers, printers, displays, CRT displays, facsimile sets, copiers, word processors, lap top personal computers, cellular phones, PHS, DVD drives, PD drives and flexible disc drives, chassis, relays, switches, case members, transformer members, coil bobbins, and also for various other applications.

Furthermore, various molded articles made of the styrene-based resin composition of this invention are suitable for painting and plating, and show excellent paint adhesion and plating properties.

The paint adhesion can be evaluated by coating a paint, drying, allowing the coated sample to stand, carrying out a cross-cut adhesion test using a cellophane adhesive tape based on JIS, and observing the pealing state of the paint.

The paints used in this invention can be acrylic paints and urethane-based paints. An acrylic paint refers to a paint containing acrylic acid, an acrylic ester, methacrylic acid or a methacrylic ester, or a copolymer resin consisting of any of the foregoing and another vinyl-based compound, as a main component capable of forming the coating film. An urethane-based paint refers to a paint having urethane bonds in the resin structure or a paint capable of producing urethane bonds in the process of forming a coating film.

Plating properties refer to the initial plating adhesive strength and the freedom from plating blisters after the heat cycle. The performance such as plating adhesive strength depends on the size, depth and number of the holes formed by etching, the strength of the base material existing around the holes, etc. The plating components go into the holes of the base material, for working as roots to give the anchoring effect of preventing the plating film formed on the surface from being peeled. However, if the base material existing around the anchors is fragile, the plating film is peeled together with the base material. So, if the base material has sufficient mechanical strength, sufficient solvent resistance to prevent the base material from being embrittled by the etchant, and a stable phase structure, it can exhibit good plating properties.

The plating method is not required to be a special plating method, and the plating method for ABS resin widely employed as a resin plating method can be employed. A typical plating process comprises the steps of (1) pretreatment, (2) surface coarsening (etching), (3) sensitizing or catalyst treatment, (4) activating or accelerating, (5) electroless plating, and (6) electroplating. Among these steps, the surface coarsening step (2) is an important step that decides the adhesion of the metal plating film formed in the later plating step, and any of various means is selectively used in response to the plastic material used. For example, for ABS resin, the chemical etching method in which the molded article is immersed in a chromic acid-sulfuric acid mixture is established.

In the styrene-based resin composition of this invention, it has been found that since the styrene-based resin (A) and the thermoplastic resin other than styrene-based resins (B) have a co-continuous structure with a wavelength of concentration fluctuation of 0.001 to 1 μm or a dispersed structure with a distance between particles of 0.001 to 1 μm as a specific phase structure, good coating film adhesion and good plating properties owing to the possibility of uniformly controlling the size, depth and number of the holes formed by etching can be obtained.

EXAMPLES

This invention is explained below in reference to working examples and comparative examples, for further particularly explaining this invention. However, this invention is not limited thereto or thereby. In the examples, "parts" means "parts by weight", and "%" means "wt %".

Reference Example 1

(A) Styrene-Based Resins (A1) Graft (Co)Polymers

Methods for producing graft copolymers are described below. The graft rate was obtained by the following method. Acetone was added to a predetermined amount (m) of a graft copolymer, and the solution was refluxed for 4 hours. The solution was centrifuged at 8000 rpm {centrifugal force 10,000 G (about 100×103 m/s2)} for 30 minutes, and the insoluble matter was collected by filtration. The insoluble matter was dried at 70° C. under reduced pressure for 5 hours, and the dry matter was weighed (n).

Graft rate=[(n)−(m)×L]/[(m)×L]×100 where L means the rubber content of the graft copolymer.

The filtrate of said acetone solution was concentrated by a rotary evaporator, to obtain a precipitate (acetone soluble matter) The soluble matter was dried at 70° C. under reduced pressure for 5 hours, and a 30° C. methyl ethyl ketone solution of 0.4 g/100 ml was prepared. The intrinsic viscosity was measured using an Ubbellohde viscometer. Furthermore, a filmy sample of about 30 μm was produced by press molding and the peak intensity ratio was obtained by FT-IR analysis, to measure the contents of the respective monomer units in the obtained graft copolymer.

A1-1

Fifty parts of a monomer mixture consisting of 70% of styrene and 30% of acrylonitrile were added in the presence of 50 parts (as solid) of polybutadiene latex (average rubber particle size 0.3 μm), and emulsion polymerization was carried out. The obtained graft copolymer was solidified using sulfuric acid, washed and dried to obtain a powder.

The graft rate of the obtained graft copolymer was 42%, and the intrinsic viscosity of the methyl ethyl ketone soluble matter was 0.37 dl/g. The contents of the respective monomer units were 50 wt % of butadiene units, 35 wt % of styrene units, and 15 wt % of acrylonitrile units.

A1-2

Fifty parts of a monomer mixture consisting of 70% of methyl methacrylate, 25% of styrene and 5% of acrylonitrile were added in the presence of 50 parts (as solid) of polybutadiene latex (average rubber particle size 0.2 μm), and emulsion polymerization was carried out. The obtained graft copolymer was solidified using sulfuric acid, washed and dried to obtain a powder.

The graft rate of the obtained graft copolymer was 45%, and the intrinsic viscosity of the methyl ethyl ketone soluble matter was 0.30 dl/g. The contents of the respective monomer units were 50 wt % of butadiene units, 35 wt % of methyl methacrylate units, 12 wt % of styrene units and 3 wt % of acrylonitrile units.

(A2) Production of Vinyl-Based Copolymers

Methods for producing vinyl-based copolymers are described below. An obtained polymer was dried at 70° C. under reduced pressure for 5 hours, and a 30° C. methyl ethyl ketone solution of 0.4 g/100 ml was prepared. The intrinsic viscosity was measured using an Ubbellohde viscometer. A filmy sample of about 30 μm was produced by press molding, and the peak intensity ratio was obtained by FT-IR analysis, to measure the contents of the respective monomer units in the obtained vinyl-based copolymer.

A2-1

Styrene-acrylonitrile copolymer "Toyolac" 1050B (produced by Toray Industries, Inc.) was used. The intrinsic viscosity of the methyl ethyl ketone soluble matter was 0.39 dl/g, and the contents of the respective monomer units were 76 wt % of styrene units and 24 wt % of acrylonitrile units.

A2-2:

A monomer mixture consisting of 70% of styrene and 30% of acrylonitrile was suspension-polymerized to prepare a vinyl-based copolymer. The intrinsic viscosity of the methyl ethyl ketone soluble matter of the obtained vinyl-based copolymer was 0.53 dl/g, and the contents of the respective monomer units were 70 wt % of styrene units and 30 wt % of acrylonitrile units.

A2-3:

A monomer mixture consisting of 70% of styrene and 30% of acrylonitrile was suspension-polymerized, to prepare a vinyl-based copolymer. The intrinsic viscosity of the methyl ethyl ketone soluble matter of the obtained vinyl-based copolymer was 0.98 dl/g, and the contents of the respective monomer units were 70 wt % of styrene units and 30 wt % of acrylonitrile units.

A2-4:

A monomer mixture consisting of 40% of styrene, 30% of acrylonitrile and 30% of α-methylstyrene was suspension-polymerized to prepare a vinyl-based copolymer. The intrinsic viscosity of the methyl ethyl ketone soluble matter of the obtained vinyl-based copolymer was 0.52 dl/g, and the contents of the respective monomer units were 40 wt % of styrene units, 30 wt % of acrylonitrile units and 30 wt % of α-methylstyrene units.

A2-5:

A monomer mixture consisting of 65% of styrene and 35% of acrylonitrile was suspension-polymerized to prepare a vinyl-based copolymer. The intrinsic viscosity of the methyl ethyl ketone soluble matter of the obtained vinyl-based copolymer was 0.54 dl/g, and the contents of the respective monomer units were 65 wt % of styrene units and 35 wt % of acrylonitrile units.

A2-6:

A monomer mixture consisting of 60% of styrene and 40% of acrylonitrile was suspension-polymerized to prepare a vinyl-based copolymer. The intrinsic viscosity of the methyl ethyl ketone soluble matter of the obtained vinyl-based copolymer was 0.51 dl/g, and the contents of the respective monomer units were 60 wt % of styrene units and 40 wt % of acrylonitrile units.

Reference Example 2

Thermoplastic Resins Other than Styrene-Based Resins (B)

B-1: Aromatic polycarbonate "Iupilon" S3000 (produced by Mitsubishi Engineering Plastic Co., Ltd.) was used.
B-2: Aromatic polycarbonate "Iupilon" S2000 (produced by Mitsubishi Engineering Plastic Co., Ltd.) was used.
B-3: Aromatic polycarbonate "Iupilon" E2000 (produced by Mitsubishi Engineering Plastic Co., Ltd.) was used.
B-4: 24.3% of 2,2'-bis(4-hydroxyphenyl)propane, 30.6% of 2,2'-bis(4-hydroxy-3,5-dimethylphenyl)propane and 45.1% of diphenyl carbonate were supplied into a mixing vessel, and after the atmosphere was substituted by nitrogen, the mixture was molten at 150° C. Into the solution, tetramethylammonium hydroxide and sodium hydroxide were added, and the mixture was stirred at 150° C. for 1 hour, to carry out the intended reaction. Then, the reaction mixture was heated to 220° C., and the pressure was reduced to 27 kPa (200 mm Hg). The mixture was stirred for 1 hour. The temperature was further raised to 250° C., and the pressure was reduced to 2 kPa (15 mm Hg). The mixture was stirred for 1 hour, to further carry out the reaction. The obtained reaction product was fed into a centrifugal thin film evaporator, to further carry out the reaction, and it was subsequently fed into a horizontal stirring polymerization vessel. It was retained at 290° C. for 30 minutes, to complete polymerization. It was taken out as a strand through a die from the horizontal stirring polymerization vessel, and the strand was cut into pellets using a cutter for use as a copolymerized aromatic polycarbonate.

Reference Example 3

(c1) Modified Styrene-Based Polymers

Methods for producing modified vinyl-based polymers are described below. An obtained polymer was dried at 70° C. under reduced pressure for 5 hours, and a 30° C. methyl ethyl ketone solution of 0.4 g/100 ml was prepared. The intrinsic viscosity was measured using an Ubbellohde viscometer. A filmy sample of about 30 μm was produced by press molding, and the peak intensity ratio was obtained by FT-IR analysis, to measure the contents of the respective monomer units in the obtained modified vinyl-based polymer.

c1-1: A monomer mixture consisting of 69.7% of styrene, 30% of acrylonitrile and 0.3% of glycidyl methacrylate was suspension-polymerized to prepare a modified vinyl-based copolymer. The intrinsic viscosity of the methyl ethyl ketone soluble matter of the obtained modified vinyl-based polymer was 0.53 dl/g, and the contents of the respective monomer units were 69.7 wt % of styrene units, 30 wt % of acrylonitrile units and 0.3 wt % of glycidyl methacrylate units.

c1-2: A monomer mixture consisting of 67% of styrene, 30% of acrylonitrile and 3% of maleic anhydride was solution-polymerized in methyl ethyl ketone solvent, to prepare a vinyl-based copolymer. The intrinsic viscosity of the methyl ethyl ketone soluble matter of the obtained vinyl-based copolymer was 0.53 dl/g, and the contents of the respective monomer units were 67 wt % of styrene units, 30 wt % of acrylonitrile units and 3 wt % of maleic anhydride units.

(c2) Polycarbonate-based graft polymers c2-1: Polycarbonate-graft-styrene/acrylonitrile copolymer (PC-g-SAN) "Modiper CH430" (produced by NOF Corporation) was used.

c2-2: Polycarbonate-graft-modified styrene/acrylonitrile copolymer (PC-g-mSAN) "Modiper CL440G" (produced by NOF Corporation) was used.

c2-3: Polycarbonate-graft-polystyrene copolymer (PC-g-PS) "Modiper CL130D" (produced by NOF Corporation) was used.

Reference Example 4

Flame Retarders

FR-1: Aromatic bisphosphate "PX200" (produced by Daihachi Chemical Industry Co., Ltd.) was used
FR-2: Brominated epoxy resin "SR-T5000" (produced by Sakamoto Yakuhin Kogyo Co., Ltd.) was used.

Reference Example 5

Additives

TZ-1: Acryl-modified polytetrafluoroethylene "Metablen" A3000 (produced by Mitsubishi Rayon Co., Ltd.) was used.

Working Examples 1 to 36 and Comparative Examples 1 to 13

Raw materials of any of the compositions of working examples and comparative examples shown in Tables 1 to 6 were supplied into a twin-screw extruder (TEX30α produced by The Japan Steel Works, Ltd.) set at an extrusion temperature of 250° C., and a gut was discharged from the die and immediately quickly cooled in ice water, to fix the structure. Thus, a polymer was produced as pellets.

The polymer obtained as pellets was molded by an injection molding machine (Promat 40/25 produced by Sumitomo Heavy Industries, Ltd.) at an injection pressure of lower limit pressure+1 MPa, to produce respective test pieces. The physical properties were measured under the following conditions.
[Impact strength] Impact strength was evaluated according to ASTM D256-56A. The average value of 6 test pieces was employed.
[Bending strength] Bending strength was evaluated according to ASTM D790.
[Elastic modulus in bending] Elastic modulus in bending was evaluated according to ASTM D790.
[Tensile strength] Tensile strength was evaluated according to ASTM D638.
[Tensile elongation] Tensile elongation was evaluated according to ASTM D638.
[Heat resistance] Heat distortion temperature was evaluated according to ASTM D648 (load: 1.82 MPa)
[Flowability] The flow length of spiral flow (sectional form: 10 mm wide×2 mm thick) (spiral flow length) was measured at a cylinder temperature of 240° C., a mold temperature of 60° C. and an injection pressure of 50 MPa.
[Limit oxygen index] Limit oxygen index was evaluated according to JIS K 7021.
[Adhesion strength of plating film] A square sheet treated by the following process till step (15) "Electroplating" (bright copper plating) was baked at 80° C. for 2 hours, and allowed to cool for 1 hour, and the force (kg) for T-peeling the plating film with a width of 10 mm by a length of 20 mm was measured as the adhesion strength.
[Thermal cycle test of plating] A square sheet treated by the following process till step (19) "Electroplating" (chromium plating) was subjected to 3 thermal cycles (each cycle consisting of 90° C. 1 hour→room temperature 15 minutes→−35° C. 1 hour→room temperature 15 minutes), and whether blistering, peeling or cracking occurred on the plating surface was observed for evaluation.
(Plating Conditions)

A molded square sheet of 80 mm×80 mm×3 mm thick molded at a mold temperature of 60° C. was plated under the following conditions.
1) A degreased test piece was immersed in "Ace Clean A-220" (produced by Okuno Chemical Industries Co., Ltd.) at 55° C. for 4 minutes.
2) Washed with water.
3) Immersed in 98 wt % sulfuric acid at 60° C. for 10 minutes for etching.
4) Washed with water.
5) Immersed in 5 wt % hydrochloric acid at 30° C. for 2 minutes for acid treatment.
6) Washed with water.
7) Immersed in a solution consisting of 150 ml of concentrated hydrochloric acid catalyst, 50 ml of Catalyst C (produced by Okuno Chemical Industries Co., Ltd.) and 1000 ml of water at 20° C. for 2 minutes.
8) Washed with water.
9) Immersed in 10 wt % sulfuric acid at 40° C. for 3 minutes for acceleration.
10) Washed with water.
11) Immersed in electroless copper plating OPC-750 (produced by Okuno Chemical Industries Co., Ltd.) at 30° C. for 8 minutes.
12) Washed with water.
13) Immersed in 5 wt % sulfuric acid for 30 seconds for activation.
14) Washed with water.
15) Electroplating (bright copper plating): A test piece was placed in an acidic copper plating bath consisting of 50 g of concentrated sulfuric acid, 200 g of copper sulfate (pentahydrate), 10 ml of SCB-MU, 1 ml of SCB-I (produced by Okuno Chemical Industries Co., Ltd.) and 1000 ml of water, to form an about 30 µm thick copper plating film in a temperature range from 20 to 25° C. at a current density of 4 A/dm$^2$.
16) Washed with water.
17) Electroplating (bright nickel plating): In a plating bath consisting of 40 g of boric acid, 50 g of nickel chloride (hexahydrate), 300 g of nickel sulfate (heptahydrate), 1 ml of Monolight (produced by Okuno Chemical Industries Co., Ltd.), 20 ml of Acna B-I (produced by Okuno Chemical Industries Co., Ltd.) and 1000 ml of water, an about 15 µm thick nickel plating film was formed at a temperature of 50° C. and at a current density of 5 A/dm$^2$.
18) Washed with water.
19) Electroplating (chromium plating): In a plating bath consisting of 5 g of concentrated sulfuric acid, 250 g of chromium oxide and 1000 ml of water, an about 0.2 µm thick chromium plating film was formed at a temperature of 45° C. and at a current density of 20 A/dm$^2$.

Furthermore, from the molded article obtained by said injection molding, a 100 µm thick section was cut out as a sample, and iodine was used to dye the polycarbonate. Then, a very thin section was cut out as a sample, and it was observed at a magnification of 50,000× using a transmission electron microscope.

Moreover, from the molded article obtained by said injection molding, a 100 µm thick section was cut out as a sample, and the wavelength of concentration fluctuation in the case of a co-continuous structure or the distance between particles in the case of a dispersed structure was measured using a small-angle X-ray scattering instrument (when the wavelength of concentration fluctuation or the distance between particles was less than 0.4µ) or a light scattering instrument (when the wavelength of concentration fluctuation or the distance between particles was 0.4µ or more). In every sample, a peak was observed, and using said peak position (θm), the wavelength of concentration fluctuation or the distance between particles (Λm) was calculated from the following formula.

$$\Lambda m = (\lambda/2)/\sin(\theta m/2)$$

Tables 1 to 6 show the structural state observed on a transmission electron microscope photograph, the wavelength of concentration fluctuation or the distance between particles found by a small-angle X-ray scattering instrument or a light scattering instrument, and respectively measured impact resistance, bending properties, tensile properties, heat resistance, flowability, plating properties and limit oxygen index of each sample.

TABLE 1

|  |  |  | Example 1 | Example 2 | Example 3 | Example 4 | Example 5 |
|---|---|---|---|---|---|---|---|
| (A) Styrene-based resin | <A1-1> | parts by weight | 10 |  | 10 | 10 | 10 |
|  | <A1-2> | parts by weight |  | 10 |  |  |  |

TABLE 1-continued

|  |  |  | Example 1 | Example 2 | Example 3 | Example 4 | Example 5 |
|---|---|---|---|---|---|---|---|
|  | <A2-1> | parts by weight |  |  | 40 |  |  |
|  | <A2-2> | parts by weight | 40 | 40 |  |  |  |
|  | <A2-3> | parts by weight |  |  |  | 40 |  |
|  | <A2-4> | parts by weight |  |  |  |  | 40 |
| (B) | <B-1> | parts by weight |  |  |  |  |  |
| Thermoplastic resin | <B-2> | parts by weight |  |  |  |  |  |
| other than | <B-3> | parts by weight | 50 | 50 | 50 | 50 | 50 |
| styrene-based resin | <B-4> | parts by weight |  |  |  |  |  |
| (C) Compatibilizar | <C1-1> | parts by weight | 5 | 5 | 5 | 5 | 5 |
|  | <C1-2> | parts by weight |  |  |  |  |  |
|  | <C2-1> | parts by weight | 5 | 5 | 5 | 5 | 5 |
|  | <C2-2> | parts by weight |  |  |  |  |  |
|  | <C2-3> | parts by weight |  |  |  |  |  |
| Injection mold | structure | — | Co-continuous structure | Co-continuous structure | Co-continuous structure | Co-continuous structure | Co-continuous structure |
|  | Wavelength of concentration fluctuation or distance between particles | μm | 0.23 | 0.25 | 0.21 | 0.22 | 0.20 |
| Impact strength |  | J/m | 900 | 970 | 880 | 1030 | 1120 |
| Bending strength |  | MPa | 95 | 95 | 95 | 95 | 96 |
| Elastic modulus in bending |  | MPa | 2580 | 2580 | 2580 | 2580 | 2590 |
| Tensile strength |  | MPa | 61 | 60 | 61 | 61 | 61 |
| Tensile elongation |  | % | 110 | 108 | 92 | 115 | 121 |
| Heat distortion temperature |  | °C. | 104 | 103 | 103 | 104 | 107 |
| Spiral flow length |  | mm | 260 | 270 | 320 | 225 | 250 |
| Adhesion strength of plating |  | kgf/cm | 1.5 | 1.5 | 1.6 | 1.4 | 1.7 |
| Surface blister of plating |  |  | non | non | non | non | non |
| Limit oxygen index |  | % | 22.0 | 21.5 | 22.0 | 22.0 | 22.0 |

TABLE 2

|  |  |  | Example 6 | Example 7 | Example 8 | Example 9 | Example 10 |
|---|---|---|---|---|---|---|---|
| (A) | <A1-1> | parts by weight | 10 | 10 | 10 | 10 | 10 |
| Styrene-based resin | <A1-2> | parts by weight |  |  |  |  |  |
|  | <A2-1> | parts by weight |  |  |  |  |  |
|  | <A2-2> | parts by weight | 40 | 40 | 40 |  | 50 |
|  | <A2-3> | parts by weight |  |  |  |  |  |
|  | <A2-4> | parts by weight |  |  |  | 40 |  |
| (B) | <B-1> | parts by weight | 50 |  |  |  |  |
| Thermoplastic resin | <B-2> | parts by weight |  | 50 |  |  |  |
| other than | <B-3> | parts by weight |  |  |  |  | 40 |
| styrene-based resin | <B-4> | parts by weight |  |  | 50 | 50 |  |
| (C) Compatibilizar | <C1-1> | parts by weight | 5 | 5 | 5 | 5 | 5 |
|  | <C1-2> | parts by weight |  |  |  |  |  |
|  | <C2-1> | parts by weight | 5 | 5 | 5 | 5 | 5 |
|  | <C2-2> | parts by weight |  |  |  |  |  |
|  | <C2-3> | parts by weight |  |  |  |  |  |
| Injection mold | structure | — | Co-continuous structure | Co-continuous structure | Co-continuous structure | Co-continuous structure | Co-continuous structure |
|  | Wavelength of concentration fluctuation or distance between particles | μm | 0.21 | 0.22 | 0.21 | 0.19 | 0.28 |
| Impact strength |  | J/m | 680 | 810 | 1100 | 1220 | 810 |
| Bending strength |  | MPa | 96 | 95 | 96 | 97 | 98 |
| Elastic modulus in bending |  | MPa | 2590 | 2580 | 2590 | 2610 | 2660 |
| Tensile strength |  | MPa | 61 | 61 | 62 | 62 | 63 |
| Tensile elongation |  | % | 103 | 104 | 116 | 127 | 98 |
| Heat distortion temperature |  | °C. | 102 | 103 | 112 | 114 | 99 |

TABLE 2-continued

|  |  | Example 6 | Example 7 | Example 8 | Example 9 | Example 10 |
|---|---|---|---|---|---|---|
| Spiral flow length | mm | 370 | 320 | 220 | 200 | 305 |
| Adhesion strength of plating | kgf/cm | 1.4 | 1.5 | 1.6 | 1.8 | 1.7 |
| Surface blister of plating |  | non | non | non | non | non |
| Limit oxygen index | % | 21.5 | 22.0 | 22.0 | 22.5 | 21.5 |

TABLE 3

|  |  |  | Example 11 | Example 12 | Example 13 | Example 14 | Example 15 |
|---|---|---|---|---|---|---|---|
| (A) Styrene-based resin | <A1-1> | parts by weight | 10 | 10 | 10 | 20 | 30 |
|  | <A1-2> | parts by weight |  |  |  |  |  |
|  | <A2-1> | parts by weight |  |  |  |  |  |
|  | <A2-2> | parts by weight | 60 | 30 | 20 | 40 | 30 |
|  | <A2-3> | parts by weight |  |  |  |  |  |
|  | <A2-4> | parts by weight |  |  |  |  |  |
| (B) Thermoplastic resin other than styrene-based resin | <B-1> | parts by weight |  |  |  |  |  |
|  | <B-2> | parts by weight |  |  |  |  |  |
|  | <B-3> | parts by weight | 30 | 60 | 70 | 40 | 40 |
|  | <B-4> | parts by weight |  |  |  |  |  |
| (C) Compatibilizar | <C1-1> | parts by weight | 5 | 5 | 5 | 5 | 5 |
|  | <C1-2> | parts by weight |  |  |  |  |  |
|  | <C2-1> | parts by weight | 5 | 5 | 5 | 5 | 5 |
|  | <C2-2> | parts by weight |  |  |  |  |  |
|  | <C2-3> | parts by weight |  |  |  |  |  |
| Injection mold | structure | — | Dispersed structure | Co-continuous structure | Dispersed structure | Co-continuous structure | Dispersed structure |
|  | Wavelength of concentration fluctuation or distance between particles | μm | 0.35 | 0.26 | 0.33 | 0.25 | 0.24 |
| Impact strength |  | J/m | 680 | 1030 | 1240 | 930 | 1050 |
| Bending strength |  | MPa | 101 | 92 | 90 | 83 | 65 |
| Elastic modulus in bending |  | MPa | 2780 | 2460 | 2380 | 2230 | 1850 |
| Tensile strength |  | MPa | 66 | 58 | 55 | 53 | 45 |
| Tensile elongation |  | % | 93 | 117 | 128 | 103 | 115 |
| Heat distortion temperature |  | ° C. | 95 | 110 | 118 | 96 | 92 |
| Spiral flow length |  | mm | 360 | 225 | 200 | 270 | 235 |
| Adhesion strength of plating |  | kgf/cm | 2.0 | 1.4 | 1.3 | 2.1 | 2.5 |
| Surface blister of plating |  |  | non | non | non | non | non |
| Limit oxygen index |  | % | 20.5 | 22.5 | 23.5 | 21.0 | 20.5 |

TABLE 4

|  |  |  | Example 16 | Example 17 | Example 18 | Example 19 | Example 20 |
|---|---|---|---|---|---|---|---|
| (A) Styrene-based resin | <A1-1> | parts by weight | 10 | 10 | 10 | 10 | 10 |
|  | <A1-2> | parts by weight |  |  |  |  |  |
|  | <A2-1> | parts by weight |  |  |  |  |  |
|  | <A2-2> | parts by weight | 40 | 40 | 40 | 40 | 40 |
|  | <A2-3> | parts by weight |  |  |  |  |  |
|  | <A2-4> | parts by weight |  |  |  |  |  |
| (B) Thermoplastic resin other than styrene-based resin | <B-1> | parts by weight |  |  |  |  |  |
|  | <B-2> | parts by weight |  |  |  |  |  |
|  | <B-3> | parts by weight | 50 | 50 | 50 | 50 | 50 |
|  | <B-4> | parts by weight |  |  |  |  |  |
| (C) Compatibilizar | <C1-1> | parts by weight |  | 5 | 5 | 1 | 9 |
|  | <C1-2> | parts by weight | 5 |  |  |  |  |
|  | <C2-1> | parts by weight | 5 |  |  | 9 | 1 |
|  | <C2-2> | parts by weight |  | 5 |  |  |  |
|  | <C2-3> | parts by weight |  |  | 5 |  |  |
| Injection mold | structure | — | Co-continuous structure | Co-continuous structure | Co-continuous structure | Co-continuous structure | Co-continuous structure |
|  | Wavelength of | μm | 0.26 | 0.23 | 0.28 | 0.30 | 0.31 |

TABLE 4-continued

|  |  | | Example 16 | Example 17 | Example 18 | Example 19 | Example 20 |
|---|---|---|---|---|---|---|---|
| | concentration fluctuation or distance between particles | | | | | | |
| Impact strength | | J/m | 870 | 910 | 850 | 890 | 880 |
| Bending strength | | MPa | 95 | 95 | 95 | 94 | 96 |
| Elastic modulus in bending | | MPa | 2580 | 2580 | 2580 | 2560 | 2600 |
| Tensile strength | | MPa | 61 | 61 | 61 | 60 | 62 |
| Tensile elongation | | % | 105 | 112 | 100 | 112 | 108 |
| Heat distortion temperature | | °C. | 105 | 103 | 102 | 103 | 105 |
| Spiral flow length | | mm | 250 | 275 | 290 | 250 | 280 |
| Adhesion strength of plating | | kgf/cm | 1.5 | 1.6 | 1.4 | 1.5 | 1.5 |
| Surface blister of plating | | | non | non | non | non | non |
| Limit oxygen index | | % | 21.5 | 22.5 | 22.0 | 22.0 | 22.0 |

TABLE 5

|  |  | | Comparative Example 1 | Comparative Example 2 | Comparative Example 3 | Comparative Example 4 |
|---|---|---|---|---|---|---|
| (A) Styrene-based resin | <A1-1> | parts by weight | 10 | 10 | 10 | 10 |
| | <A1-2> | parts by weight | | | | |
| | <A2-1> | parts by weight | | | | |
| | <A2-2> | parts by weight | 40 | 40 | 40 | 40 |
| | <A2-3> | parts by weight | | | | |
| | <A2-4> | parts by weight | | | | |
| (B) Thermoplastic resin other than styrene-based resin | <B-1> | parts by weight | | | | |
| | <B-2> | parts by weight | | | | |
| | <B-3> | parts by weight | 50 | 50 | 50 | 50 |
| | <B-4> | parts by weight | | | | |
| (C) Compatibilizar | <C1-1> | parts by weight | | 10 | | |
| | <C1-2> | parts by weight | | | 10 | |
| | <C2-1> | parts by weight | | | | 10 |
| | <C2-2> | parts by weight | | | | |
| | <C2-3> | parts by weight | | | | |
| Injection mold | structure | — | Dispersed structure | Dispersed structure | Dispersed structure | Dispersed structure |
| | Wavelength of concentration fluctuation or distance between particles | μm | 1.58 | 1.24 | 1.30 | 1.13 |
| Impact strength | | J/m | 620 | 720 | 700 | 760 |
| Bending strength | | MPa | 96 | 96 | 96 | 94 |
| Elastic modulus in bending | | MPa | 2590 | 2590 | 2590 | 2570 |
| Tensile strength | | MPa | 62 | 62 | 62 | 60 |
| Tensile elongation | | % | 68 | 78 | 75 | 83 |
| Heat distortion temperature | | °C. | 104 | 103 | 103 | 105 |
| Spiral flow length | | mm | 220 | 235 | 230 | 240 |
| Adhesion strength of plating | | kgf/cm | 0.8 | 0.9 | 0.9 | 1.2 |
| Surface blister of plating | | | yes | yes | yes | yes |
| Limit oxygen index | | % | 21.0 | 21.5 | 21.5 | 21.5 |

TABLE 6

|  |  | | Comparative Example 5 | Comparative Example 6 | Comparative Example 7 | Comparative Example 8 |
|---|---|---|---|---|---|---|
| (A) Styrene-based resin | <A1-1> | parts by weight | 10 | 10 | 10 | 10 |
| | <A1-2> | parts by weight | | | | |
| | <A2-1> | parts by weight | | | | |

TABLE 6-continued

|  |  |  | Comparative Example 5 | Comparative Example 6 | Comparative Example 7 | Comparative Example 8 |
|---|---|---|---|---|---|---|
|  | <A2-2> | parts by weight | 40 | 40 | 60 | 20 |
|  | <A2-3> | parts by weight |  |  |  |  |
|  | <A2-4> | parts by weight |  |  |  |  |
| (B) Thermoplastic resin other than styrene-based resin | <B-1> | parts by weight |  |  |  |  |
|  | <B-2> | parts by weight |  |  |  |  |
|  | <B-3> | parts by weight | 50 | 50 | 30 | 70 |
|  | <B-4> | parts by weight |  |  |  |  |
| (C) Compatibilizar | <C1-1> | parts by weight |  |  |  |  |
|  | <C1-2> | parts by weight |  |  |  |  |
|  | <C2-1> | parts by weight |  |  | 10 | 10 |
|  | <C2-2> | parts by weight | 10 |  |  |  |
|  | <C2-3> | parts by weight |  | 10 |  |  |
| Injection mold | structure | — | Dispersed structure | Dispersed structure | Dispersed structure | Dispersed structure |
|  | Wavelength of concentration fluctuation or distance between particles | μm | 1.15 | 1.26 | 1.18 | 1.14 |
| Impact strength |  | J/m | 750 | 680 | 470 | 950 |
| Bending strength |  | MPa | 94 | 95 | 100 | 90 |
| Elastic modulus in bending |  | MPa | 2570 | 2580 | 2760 | 237 |
| Tensile strength |  | MPa | 60 | 61 | 65 | 54 |
| Tensile elongation |  | % | 82 | 77 | 70 | 96 |
| Heat distortion temperature |  | ° C. | 105 | 105 | 94 | 118 |
| Spiral flow length |  | mm | 235 | 230 | 310 | 140 |
| Adhesion strength of plating |  | kgf/cm | 1.2 | 0.9 | 1.5 | 0.7 |
| Surface blister of plating |  |  | non | yes | non | yes |
| Limit oxygen index |  | % | 21.5 | 21.5 | 20.0 | 22.0 |

As can be seen from Working Examples 1 to 15, when the styrene-based resin (A), the polycarbonate-based resin (b), the modified styrene-based polymer (c1) and the polycarbonate-based graft polymer (c2) were used together according to this invention, a co-continuous structure or a dispersed structure of 1 μm or less as a fine phase structure could be stably obtained by practical injection molding, and mechanical properties, heat resistance, flowability, plating properties and flame retardancy could be remarkably improved. Especially when the styrene-based resin having α-methylstyrene units (A2-4) described in Working Examples 5 and 9 and the copolymerized aromatic polycarbonate (B-4) described in Working Examples 8 and 9 were used, the miscibility due to the decrease of free volume under shear flow during melt blending could be enhanced, and the desired phase structure could be easily obtained to show remarkable improvement of properties.

Furthermore, in Working Examples 14 and 15, when the graft polymer (A1-1) was increased, the plating properties could be improved while the machine properties could be maintained.

Still furthermore in Working Examples 16 to 20, also when the modified styrene-based polymer (c1) and the polycarbonate-based graft polymer (c2) and their amounts were changed, excellent properties as described above could be obtained.

On the contrary, as can be seen from Comparative Examples 1 to 8, when the modified styrene-based polymer (c1) and the polycarbonate-based graft polymer (c2) were not used or when either the modified styrene-based polymer (c1) or the polycarbonate-based graft polymer (c2) alone was used, the desired phase structure could not be obtained by ordinary injection molding, and the mechanical properties, flowability and plating properties were low.

In comparison between Working Example 11 and Comparative Example 7, when the amount of the polycarbonate resin necessary for enhancing the impact resistance was as small as 30 parts by weight, the impact resistance greatly declined in Comparative Example 7. On the contrary, when the modified styrene-based polymer (c1) and the polycarbonate-based graft polymer (c2) were used together, a co-continuous structure as a fine structure could be obtained, and the flowability, chemicals resistance and plating properties could be remarkably improved while the impact resistance remained equivalent to that of Comparative Examples 1 to 6 in which 50 parts by weight of the polycarbonate resin were added.

The raw materials of any of the compositions of the working examples shown in Tables 7 and 8 were melt-blended and injection-molded as in Working Examples 1 to 20. Tables 7 and 8 shows the structural state observed on a transmission electron microscope photograph, the wavelength of concentration fluctuation or the distance between particles found by a small-angle X-ray scattering instrument or a light scattering instrument, further respectively measured impact resistance, bending properties, tensile properties, heat resistance, flowability, plating properties and limit oxygen index of each sample.

TABLE 7

|  |  |  | Example 1 | Example 4 | Example 7 | Example 21 | Example 6 | Example 22 |
|---|---|---|---|---|---|---|---|---|
| (A) Styrene-based resin | <A1-1> | parts by weight | 10 | 10 | 10 | 10 | 10 | 10 |
|  | <A1-2> | parts by weight |  |  |  |  |  |  |
|  | <A2-1> | parts by weight |  |  |  |  |  |  |
|  | <A2-2> | parts by weight | 40 |  | 40 |  | 40 |  |
|  | <A2-3> | parts by weight |  | 40 |  | 40 |  | 40 |
|  | <A2-4> | parts by weight |  |  |  |  |  |  |
| (B) Thermoplastic resin other than styrene-based resin | <B-1> | parts by weight |  |  |  |  | 50 | 50 |
|  | <B-2> | parts by weight |  |  | 50 | 50 |  |  |
|  | <B-3> | parts by weight | 50 | 50 |  |  |  |  |
|  | <B-4> | parts by weight |  |  |  |  |  |  |
| (C) Compatibilizar | <C1-1> | parts by weight | 5 | 5 | 5 | 5 | 5 | 5 |
|  | <C1-2> | parts by weight |  |  |  |  |  |  |
|  | <C2-1> | parts by weight | 5 | 5 | 5 | 5 | 5 | 5 |
|  | <C2-2> | parts by weight |  |  |  |  |  |  |
|  | <C2-3> | parts by weight |  |  |  |  |  |  |
| Ratio of melt viscosity (a)/(b) |  |  | 0.14 | 0.20 | 0.24 | 0.35 | 0.40 | 0.58 |
| Injection mold | structure | — | s structure | s structure | s structure | s structure | s structure | s structure |
|  | Wavelength of concentration fluctuation or distance between particles | μm | 0.23 | 0.22 | 0.22 | 0.20 | 0.21 | 0.20 |
| Impact strength |  | J/m | 900 | 1030 | 810 | 900 | 680 | 760 |
| Bending strength |  | MPa | 95 | 95 | 95 | 95 | 96 | 96 |
| Elastic modulus in bending |  | MPa | 2580 | 2580 | 2580 | 2580 | 2590 | 2590 |
| Tensile strength |  | MPa | 61 | 61 | 61 | 61 | 61 | 61 |
| Tensile elongation |  | % | 110 | 115 | 104 | 110 | 103 | 108 |
| Heat distortion temperature |  | °C. | 104 | 104 | 103 | 103 | 102 | 102 |
| Spiral flow length |  | mm | 260 | 225 | 320 | 290 | 370 | 355 |
| Adhesion strength of plating |  | kgf/cm | 1.5 | 1.4 | 1.5 | 1.4 | 1.4 | 1.5 |
| Surface blister of plating |  |  | non | non | non | non | non | non |
| Limit oxygen index |  | % | 22.0 | 22.0 | 22.0 | 22.0 | 21.5 | 21.5 |

TABLE 8

|  |  |  | Example 11 | Example 23 | Example 13 | Example 24 |
|---|---|---|---|---|---|---|
| (A) Styrene-based resin | <A1-1> | parts by weight | 10 | 10 | 10 | 10 |
|  | <A1-2> | parts by weight |  |  |  |  |
|  | <A2-1> | parts by weight |  |  |  |  |
|  | <A2-2> | parts by weight | 60 | 60 | 20 | 20 |
|  | <A2-3> | parts by weight |  |  |  |  |
|  | <A2-4> | parts by weight |  |  |  |  |
| (B) Thermoplastic resin other than styrene-based resin | <B-1> | parts by weight |  |  |  |  |
|  | <B-2> | parts by weight |  | 30 |  | 70 |
|  | <B-3> | parts by weight | 30 |  | 70 |  |
|  | <B-4> | parts by weight |  |  |  |  |
| (C) Compatibilizar | <C1-1> | parts by weight | 5 | 5 | 5 | 5 |
|  | <C1-2> | parts by weight |  |  |  |  |
|  | <C2-1> | parts by weight | 5 | 5 | 5 | 5 |
|  | <C2-2> | parts by weight |  |  |  |  |
|  | <C2-3> | parts by weight |  |  |  |  |
| Ratio of melt viscosity (a)/(b) |  |  | 0.12 | 0.21 | 0.18 | 0.32 |
| Injection mold | structure | — | Dispersed structure | Dispersed structure | Dispersed structure | Co-continuous structure |
|  | Wavelength of concentration fluctuation or distance between particles | μm | 0.35 | 0.32 | 0.33 | 0.28 |
| Impact strength |  | J/m | 680 | 680 | 1240 | 1180 |
| Bending strength |  | MPa | 101 | 101 | 90 | 90 |
| Elastic modulus in bending |  | MPa | 2780 | 2780 | 2380 | 2380 |
| Tensile strength |  | MPa | 66 | 66 | 55 | 55 |
| Tensile elongation |  | % | 93 | 94 | 128 | 121 |
| Heat distortion temperature |  | °C. | 95 | 95 | 118 | 117 |

TABLE 8-continued

|  |  | Example 11 | Example 23 | Example 13 | Example 24 |
|---|---|---|---|---|---|
| Spiral flow length | mm | 360 | 400 | 200 | 280 |
| Adhesion strength of plating | kgf/cm | 2.0 | 2.0 | 1.3 | 1.3 |
| Surface blister of plating |  | non | non | non | non |
| Limit oxygen index | % | 20.5 | 20.5 | 23.5 | 23.5 |

As can be seen from Working Examples, 1, 4, 6, 7 and 21-24, when the ratio of the melt viscosity of the styrene-based resin (A) to that of the polycarbonate-based resin (b) was set at a specific ratio, a co-continuous structure or a dispersed structure of 1 μm or less as a fine phase structure could be more stably obtained, and the mechanical properties could be improved. It can be seen that even when the polycarbonate resin necessary for enhancing the impact resistance was changed into a polycarbonate resin with higher flowability (lower molecular weight), the impact strength could be kept at a high value of 600 J/m or more.

The raw materials of any of the compositions of the working examples and Comparative Examples shown in Table 9 were melt-blended and injection-molded as in Working Examples 1 to 20. Table 9 shows the structural state observed on a transmission electron microscope photograph, the wavelength of concentration fluctuation or the distance between particles found by a small-angle X-ray scattering instrument or a light scattering instrument, further respectively measured impact resistance, bending properties, tensile properties, heat resistance, flowability, plating properties, limit oxygen index and chemicals resistance of each sample.

[Chemicals resistance] A ⅛" (about 3.2 mm) thick bending test piece was allowed to stand in any of the following chemical solutions at 23° C. for 7 days (every 24 hours, the container was manually gently turned to stir the chemical solution in it). Then, the test piece was taken out of the chemical solution, washed with running water and conditioned in air of 23° C. and 50% RH for 7 days. After removing the chemical solution, the bending strength was evaluated according to ASTM D790. The elastic modulus in bending was measured before and after immersing in the chemical solution, to obtain the rate of holding the elastic modulus in bending.
(1) sulfuric acid aqueous solution
(2) 30% sodium hydroxide aqueous solution
(3) Methanol
(4) Thinner

TABLE 9

|  |  |  | Example 1 | Example 25 | Example 26 | Example 27 | Comparative Example 9 | Comparative Example 10 |
|---|---|---|---|---|---|---|---|---|
| (A) Styrene-based resin | <A1-1> | parts by weight | 10 | 10 | 10 | 10 | 10 |  |
|  | <A1-2> | parts by weight |  |  |  |  |  |  |
|  | <A2-1> | parts by weight |  |  |  |  |  |  |
|  | <A2-2> | parts by weight | 40 |  |  |  | 90 |  |
|  | <A2-3> | parts by weight |  | 40 |  | 20 |  |  |
|  | <A2-4> | parts by weight |  |  | 40 |  |  |  |
| (B) Thermoplastic resin other than styrene-based resin | <B-1> | parts by weight |  |  |  |  |  |  |
|  | <B-2> | parts by weight |  |  |  |  |  |  |
|  | <B-3> | parts by weight | 50 | 50 | 50 | 70 |  | 100 |
|  | <B-4> | parts by weight |  |  |  |  |  |  |
| (C) Compatibilizar | <C1-1> | parts by weight | 5 | 5 | 5 | 5 |  |  |
|  | <C1-2> | parts by weight |  |  |  |  |  |  |
|  | <C2-1> | parts by weight | 5 | 5 | 5 | 5 |  |  |
|  | <C2-2> | parts by weight |  |  |  |  |  |  |
|  | <C2-3> | parts by weight |  |  |  |  |  |  |
| Amount of the vinyl cyanide in the styrene-based resin |  | 重量% | 13.5 | 15.5 | 17.5 | 8.5 | 28.5 | — |
| Injection mold | structure |  | — | s structure | s structure | s structure | s structure | — | — |
|  | Wavelength of concentration fluctuation or distance between particles | μm |  | 0.23 | 0.28 | 0.32 | 0.33 | — | — |
| Impact strength |  | J/m | 900 | 870 | 800 | 1180 | 150 | 1350 |
| Bending strength |  | MPa | 95 | 95 | 96 | 90 | 102 | 93 |
| Elastic modulus in bending |  | MPa | 2580 | 2590 | 2600 | 2380 | 2830 | 2300 |
| Tensile strength |  | MPa | 61 | 61 | 62 | 55 | 67 | 60 |
| Tensile elongation |  | % | 110 | 108 | 103 | 128 | 17 | 137 |
| Heat distortion temperature |  | °C. | 104 | 104 | 105 | 118 | 89 | 133 |
| Spiral flow length |  | mm | 260 | 255 | 245 | 190 | 480 | 140 |
| Adhesion strength of plating |  | kgf/cm | 1.5 | 1.3 | 1.2 | 1.3 | 2.6 | 0.7 |
| Surface blister of plating |  |  | non | non | non | non | non | yes |
| Limit oxygen index |  | % | 22.0 | 22.0 | 22.5 | 23.5 | 18.5 | 27.0 |
| Rate of holding the elastic modulus in bending | 10% sulfuric acid aqueous solution | % | 96 | 97 | 98 | 94 | 96 | 95 |
|  | 30% sodium hydroxide | % | 95 | 95 | 96 | 93 | 95 | 70 |

TABLE 9-continued

|  |  | Example 1 | Example 25 | Example 26 | Example 27 | Comparative Example 9 | Comparative Example 10 |
|---|---|---|---|---|---|---|---|
| aqueous solution | | | | | | | |
| Ethanol | % | 94 | 95 | 96 | 92 | 97 | 82 |
| Thinner | % | 92 | 95 | 97 | 90 | 96 | 65 |

If the amount of a highly polar vinyl cyanide-based monomer is increased, the melt processability generally declines to greatly lower the mechanical properties of the obtained composition. However, as can be seen from Working Examples 1 and 25-27 and Comparative Examples 9 and 10, even when the amount of the vinyl cyanide in the styrene-based resin (A) was increased in this invention, a co-continuous structure or a dispersed structure of 1 μm or less as a fine phase structure could be stably obtained, and the chemicals resistance achieved was equivalent to that of the ABS resin shown in Comparative Example 9. Furthermore, as shown in Working Example 27, even when the total amount of the vinyl cyanide was small in the composition, the composition could have holding rates of more than 90% against all the chemical solutions, showing excellent chemicals resistance, since it had said specific phase structure.

Moreover, when the amount of vinyl cyanide is large, the conventional composition shows such disadvantages as low plating adhesion strength and blistering, but since the composition of this invention has said specific phase structure, the decline of plating adhesion strength can be inhibited while such disadvantages as blistering can be overcome.

The raw materials of any of the compositions of Working Examples 1, 28 and 29 shown in Table 10 were supplied into a twin-screw extruder with L/D=45.5 (TEX30α produced by The Japan Steel Works, Ltd.), and the raw materials of the composition of Working Example 30 were supplied into a twin-screw extruder with L/D=28.0 (PCM-30 produced by Ikegai Corporation). The raw materials were heated, plasticized and melt-blended under the conditions shown in the table and a gut was discharged from the die and immediately quickly cooled in ice water to fix the structure, to produce a polymer as pellets. The resin temperature in the table was the temperature of the polymer measured immediately after discharge using a thermocouple, and the resin pressure was measured in gauge pressure by a resin pressure gauge installed in the kneading portion of the barrel of the extruder. Table 10 shows the structural state observed on a transmission electron microscope photograph, the wavelength of concentration fluctuation or the distance between particles found by a small-angle X-ray scattering instrument or a light scattering instrument, further respectively measured impact resistance, bending properties, tensile properties, heat resistance, flowability, plating properties and limit oxygen index of each sample.

TABLE 10

|  |  |  | Example 1 | Example 28 | Example 29 | Example 30 |
|---|---|---|---|---|---|---|
| (A) Styrene-based resin | <A1-1> | parts by weight | 10 | 10 | 10 | 10 |
|  | <A1-2> | parts by weight | | | | |
|  | <A2-1> | parts by weight | | | | |
|  | <A2-2> | parts by weight | 40 | 40 | 40 | 40 |
|  | <A2-3> | parts by weight | | | | |
|  | <A2-4> | parts by weight | | | | |
| (B) Thermoplastic resin other than styrene-based resin | <B-1> | parts by weight | | | | |
|  | <B-2> | parts by weight | | | | |
|  | <B-3> | parts by weight | 50 | 50 | 50 | 50 |
|  | <B-4> | parts by weight | | | | |
| (C) Compatibilizar | <C1-1> | parts by weight | 5 | 5 | 5 | 5 |
|  | <C1-2> | parts by weight | | | | |
|  | <C2-1> | parts by weight | 5 | 5 | 5 | 5 |
|  | <C2-2> | parts by weight | | | | |
|  | <C2-3> | parts by weight | | | | |
| Barrel ratio Length/Diameter(L/ | | — | 45.5 | 45.5 | 45.5 | 28.0 |
| Barrel temperature | | ° C. | 250 | 210 | 210 | 220 |
| revolution per minute | | rpm | 150 | 300 | 700 | 300 |
| feed speed | | kg/hr | 20 | 35 | 55 | 25 |
| Resin temperature | | ° C. | 264 | 265 | 282 | 264 |
| Resin pressure | | MPa | 3.0 | 4.3 | 3.4 | 3.4 |
| Injection mold | structure | — | Co-continuous structure | Co-continuous structure | Co-continuous structure | Co-continuous structure |
|  | Wavelength of concentration fluctuation or distance between particles | μm | 0.23 | 0.15 | 0.22 | 0.28 |
| Impact strength | | J/m | 900 | 1020 | 920 | 850 |
| Bending strength | | MPa | 95 | 95 | 95 | 95 |
| Elastic modulus in bending | | MPa | 2580 | 2580 | 2580 | 2580 |
| Tensile strength | | MPa | 61 | 61 | 61 | 61 |
| Tensile elongation | | % | 110 | 127 | 115 | 102 |
| Heat distortion temperature | | ° C. | 104 | 104 | 104 | 104 |

TABLE 10-continued

|  |  | Example 1 | Example 28 | Example 29 | Example 30 |
|---|---|---|---|---|---|
| Spiral flow length | mm | 260 | 265 | 260 | 260 |
| Adhesion strength of plating | kgf/cm | 1.5 | 1.8 | 1.6 | 1.4 |
| Surface blister of plating |  | non | non | non | non |
| Limit oxygen index | % | 22.0 | 22.5 | 22.0 | 21.5 |

As can be seen from Working Examples 1 and 28 to 30, even when various production conditions were changed, a co-continuous structure of 1 µm or less as a fine structure could be stably obtained by melt blending at a resin pressure of 2.0 MPa or more, and the mechanical properties, heat resistance and flowability could be improved. Furthermore, as can be seen from Working Example 30, when a melt blending machine with a small L/D value was used, properties tended to decline to some extent since the reaction time necessary for making the resins miscible with each other became short, but a co-continuous structure or a dispersed structure of 1 µm or less as a fine structure could be stably obtained.

Moreover, the raw materials of any of the compositions of the working examples and comparative examples shown in Tables 11 and 12 were melt-blended and injection-molded as in Working Examples 1 to 20. Tables 11 and 12 shows the structural state observed on a transmission electron microscope photograph, the wavelength of concentration fluctuation or the distance between particles found by a small-angle X-ray scattering instrument or a light scattering instrument, further respectively measured impact resistance, bending properties, tensile properties, heat resistance, flowability, plating properties and limit oxygen index of each sample.

TABLE 11

|  |  |  | Example 31 | Example 32 | Example 33 | Example 34 | Example 35 | Example 36 |
|---|---|---|---|---|---|---|---|---|
| (A) Styrene-based resin | <A1-1> | parts by weight | 10 | 10 | 10 | 10 | 10 | 10 |
|  | <A1-2> | parts by weight |  |  |  |  |  |  |
|  | <A2-1> | parts by weight |  |  |  |  |  |  |
|  | <A2-2> | parts by weight | 40 | 40 | 40 | 40 | 50 | 30 |
|  | <A2-3> | parts by weight |  |  |  |  |  |  |
|  | <A2-4> | parts by weight |  |  |  |  |  |  |
| (B) Thermoplastic resin other than styrene-based resin | <B-1> | parts by weight |  |  |  |  |  |  |
|  | <B-2> | parts by weight |  |  |  |  |  |  |
|  | <B-3> | parts by weight | 50 | 50 | 50 | 50 | 40 | 60 |
|  | <B-4> | parts by weight |  |  |  |  |  |  |
| (C) Compatibilizar | <C1-1> | parts by weight | 5 | 5 | 5 | 5 | 5 | 5 |
|  | <C1-2> | parts by weight |  |  |  |  |  |  |
|  | <C2-1> | parts by weight | 5 | 5 | 5 |  | 5 | 5 |
|  | <C2-2> | parts by weight |  |  |  | 5 |  |  |
|  | <C2-3> | parts by weight |  |  |  |  |  |  |
| Flame retardant | <FR-1> | parts by weight | 10 | 20 |  | 10 | 10 | 10 |
|  | <FR-2> | parts by weight |  |  | 10 |  |  |  |
| Additive | <TZ-1> | parts by weight | 0.2 | 0.2 | 0.2 | 0.2 | 0.2 | 0.2 |
| Injection mold | structure | — | s structure | s structure | s structure | s structure | s structure | s structure |
|  | Wavelength of concentration fluctuation or distance between particles | µm | 0.22 | 0.24 | 0.28 | 0.21 | 0.26 | 0.25 |
| Impact strength |  | J/m | 810 | 670 | 820 | 830 | 700 | 960 |
| Bending strength |  | MPa | 97 | 98 | 97 | 97 | 99 | 93 |
| Elastic modulus in bending |  | MPa | 2600 | 2630 | 2590 | 2610 | 2680 | 2480 |
| Tensile strength |  | MPa | 62 | 63 | 61 | 62 | 64 | 59 |
| Tensile elongation |  | % | 97 | 83 | 95 | 103 | 88 | 105 |
| Heat distortion temperature |  | ° C. | 96 | 90 | 101 | 96 | 91 | 102 |
| Spiral flow length |  | mm | 380 | 460 | 300 | 370 | 415 | 340 |
| Adhesion strength of plating |  | kgf/cm | 1.6 | 1.5 | 1.4 | 1.5 | 1.7 | 1.4 |
| Surface blister of plating |  |  | non | non | non | non | non | non |
| Limit oxygen index |  | % | 26.5 | 31.0 | 26.0 | 27.0 | 26.0 | 27.5 |

TABLE 12

|  |  |  | Comparative Example 11 | Comparative Example 12 | Comparative Example 13 |
|---|---|---|---|---|---|
| (A) Styrene-based resin | <A1-1> | parts by weight | 10 | 10 | 10 |
|  | <A1-2> | parts by weight |  |  |  |
|  | <A2-1> | parts by weight |  |  |  |
|  | <A2-2> | parts by weight | 40 | 40 | 40 |

TABLE 12-continued

|  |  |  | Comparative Example 11 | Comparative Example 12 | Comparative Example 13 |
|---|---|---|---|---|---|
|  | <A2-3> | parts by weight |  |  |  |
|  | <A2-4> | parts by weight |  |  |  |
| (B) Thermoplastic resin other than styrene-based resin | <B-1> | parts by weight |  |  |  |
|  | <B-2> | parts by weight |  |  |  |
|  | <B-3> | parts by weight | 50 | 50 | 50 |
|  | <B-4> | parts by weight |  |  |  |
| (C) Compatibilizar | <C1-1> | parts by weight |  | 10 |  |
|  | <C1-2> | parts by weight |  |  |  |
|  | <C2-1> | parts by weight |  |  | 10 |
|  | <C2-2> | parts by weight |  |  |  |
|  | <C2-3> | parts by weight |  |  |  |
| Flame retardant | <FR-1> | parts by weight | 10 | 10 | 10 |
|  | <FR-2> | parts by weight |  |  |  |
| Additive | <TZ-1> | parts by weight | 0.2 | 0.2 | 0.2 |
| Injection mold | structure |  | — | Dispersed structure | Dispersed structure | Dispersed structure |
|  | Wavelength of concentration fluctuation or distance between particles | μm |  | 1.65 | 1.32 | 1.26 |
| Impact strength |  | J/m | 400 | 520 | 580 |
| Bending strength |  | MPa | 97 | 98 | 96 |
| Elastic modulus in bending |  | MPa | 2600 | 2610 | 2590 |
| Tensile strength |  | MPa | 62 | 63 | 61 |
| Tensile elongation |  | % | 42 | 56 | 65 |
| Heat distortion temperature |  | ° C. | 96 | 95 | 97 |
| Spiral flow length |  | mm | 320 | 335 | 340 |
| Adhesion strength of plating |  | kgf/cm | 0.6 | 0.8 | 0.9 |
| Surface blister of plating |  |  | yes | yes | yes |
| Limit oxygen index |  | % | 25.0 | 25.5 | 25.5 |

As can be seen from Working Examples 31 to 36 and Comparative Examples 11 to 13, even when a flame retarder and additives were added to the styrene-based resin composition, flame retardancy could be remarkably improved while the mechanical properties, heat resistance, flowability and plating properties could be maintained, since the resin composition had a co-continuous structure of 1 μm or less as a fine phase structure according to this invention.

On the other hand, as can be seen from Comparative Examples 11 to 13, in the case where a flame retarder and additives were added to a composition containing neither the modified styrene-based polymer (c1) nor the polycarbonate-based graft polymer (c2) or containing either the modified styrene-based polymer (c1) or the polycarbonate-based graft polymer (c2) alone, the desired phase structure could not be obtained, and the mechanical properties were low. Furthermore, the flame retardancy was remarkably lower than that of the resin composition of this invention. To achieve the flame retardancy equivalent to that of the present invention, the added amount of the flame retarder must be very large.

Industrial Applicability

The resin composition of this invention can be used for various applications such as electric/electronic parts, automobile parts, mechanical parts, housings and parts of OA apparatuses and household electric appliances, miscellaneous goods, etc.

Figure 1:
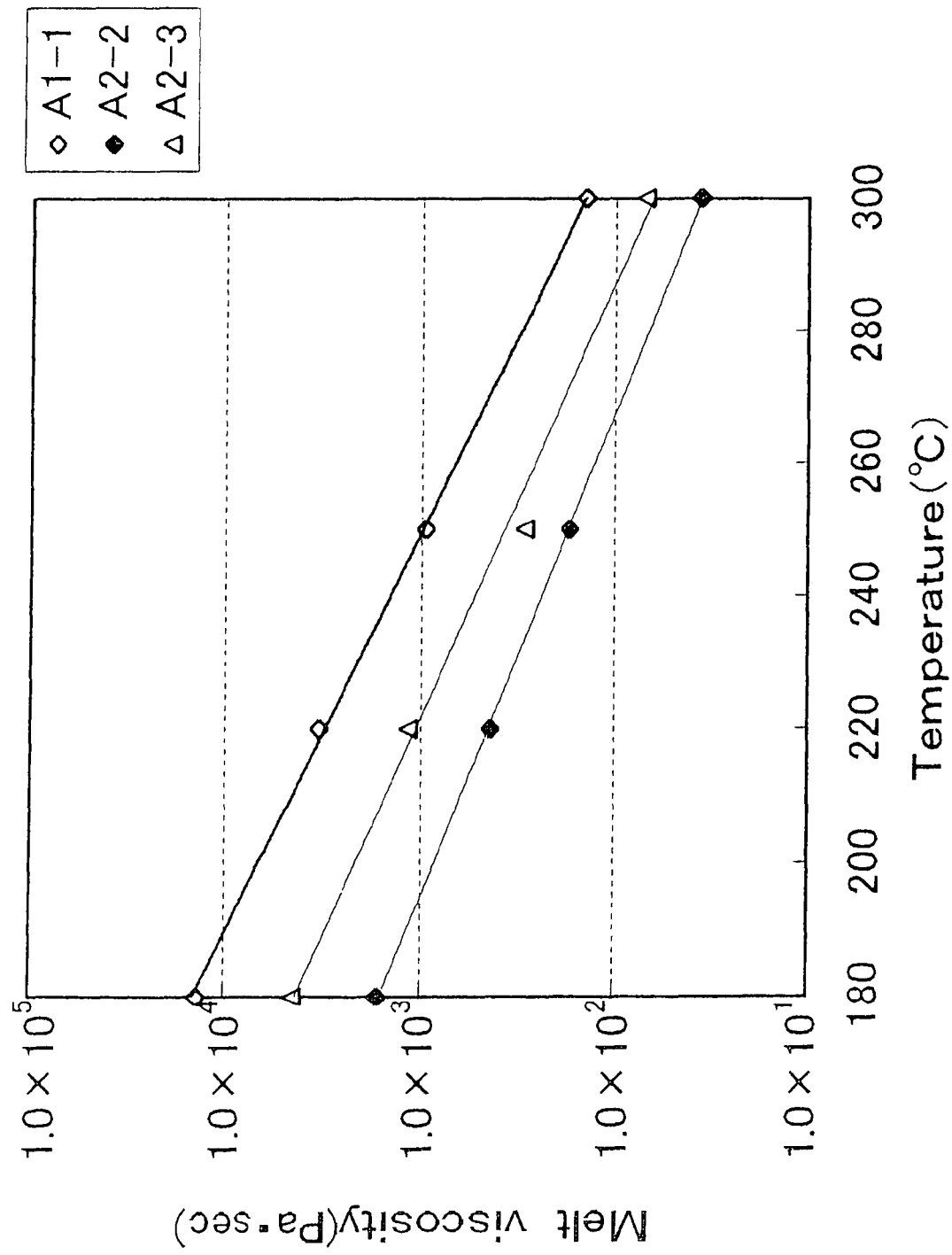
[FIG. 1] is a graph showing how the melt viscosity of A1-1, A2-2, A2-3 used in the working examples measured at a shear rate of 1000/sec was affected by the temperature.
Figure 2:
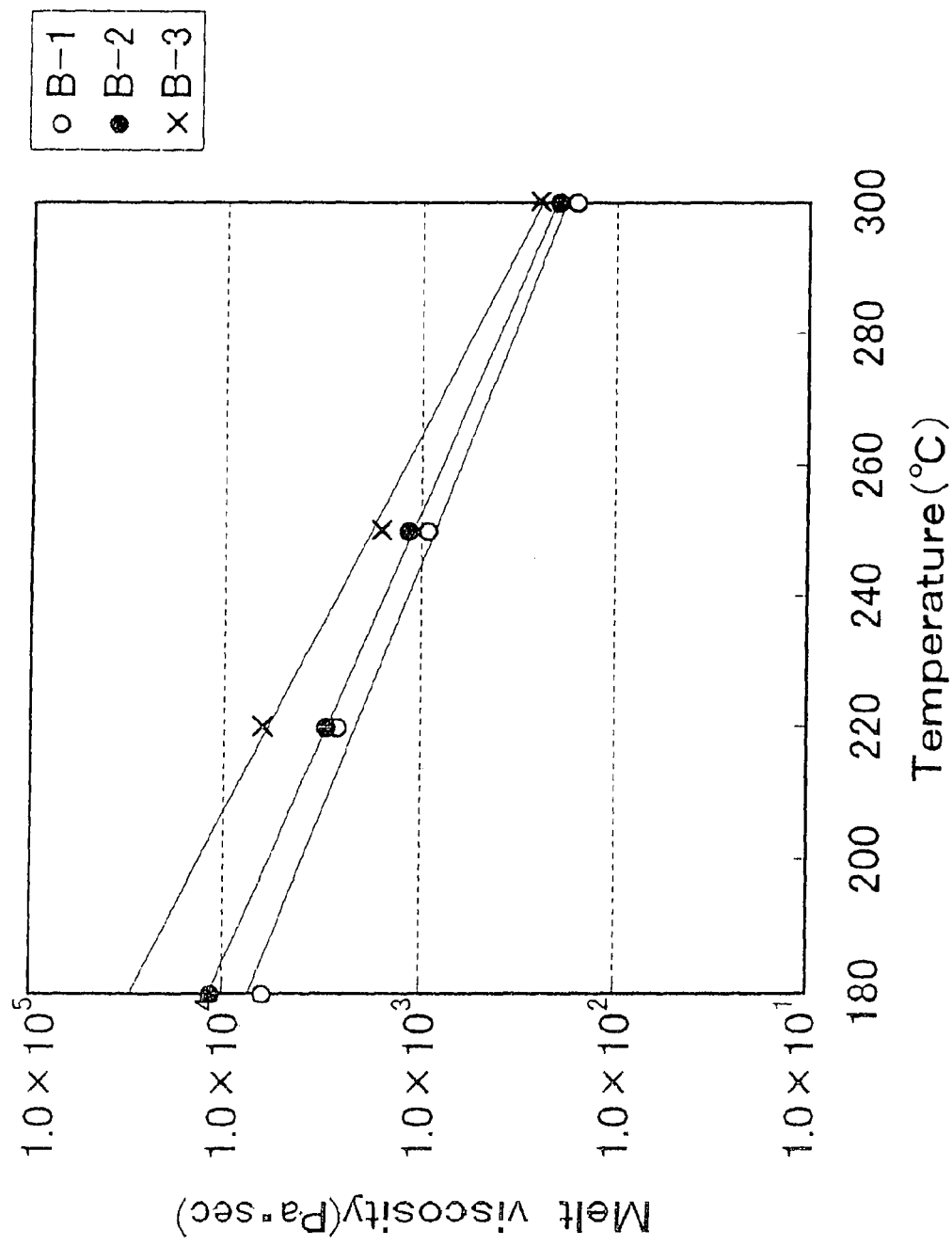
[FIG. 2] is a graph showing how the melt viscosity of B-1, B-2, B-3 used in the working examples measured at a shear rate of 1000/sec was affected by the temperature.
Figure 3:
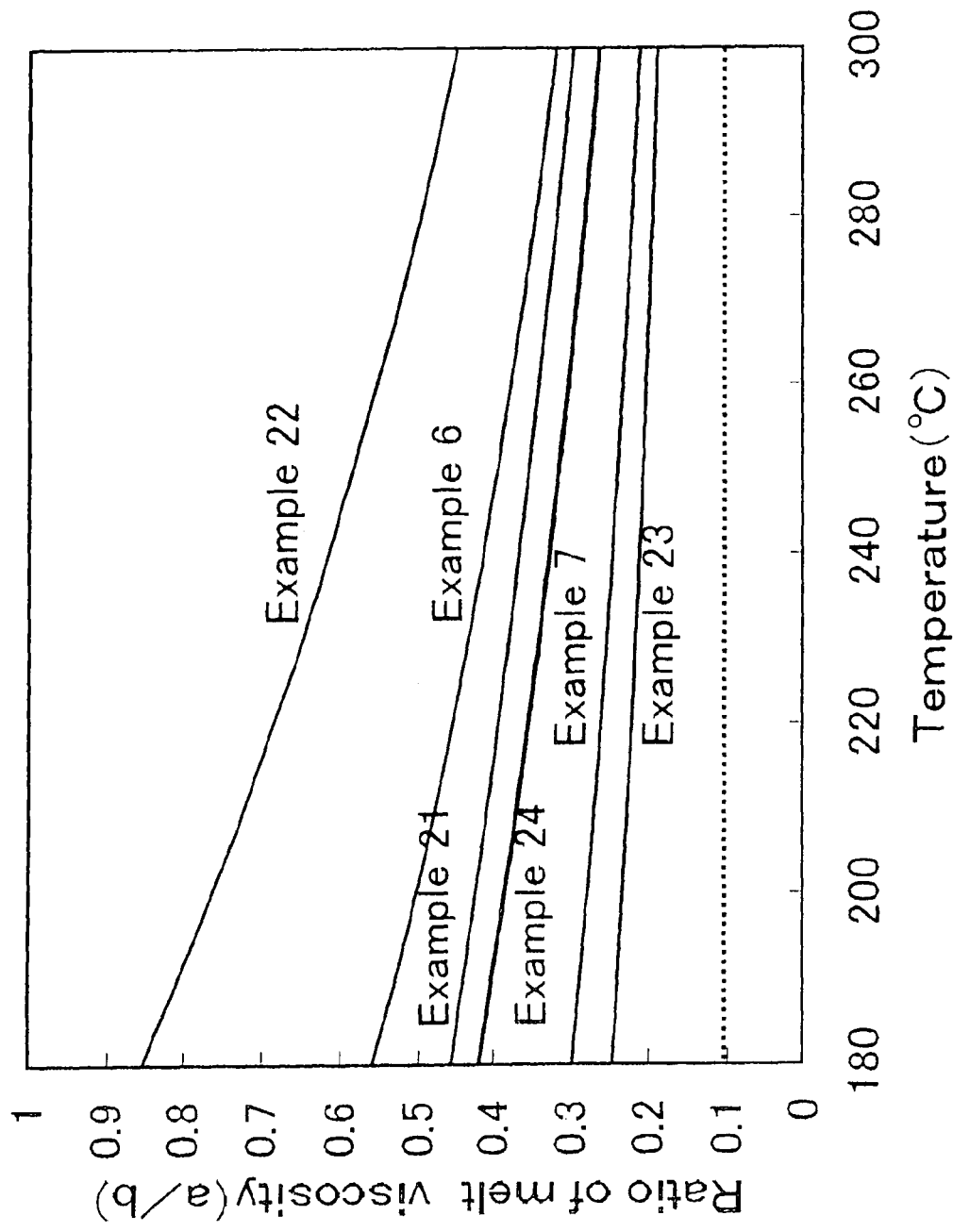
[FIG. 3] is a graph showing how the ratio of the melt viscosity of the styrene-based resin (A) to that of the thermoplastic resin other than styrene-based resins (B) in the working examples, 6, 7, 21, 22, 23 and 24 was affected by the temperature, based on the results obtained in FIGS. 1 and 2.
Figure 4:
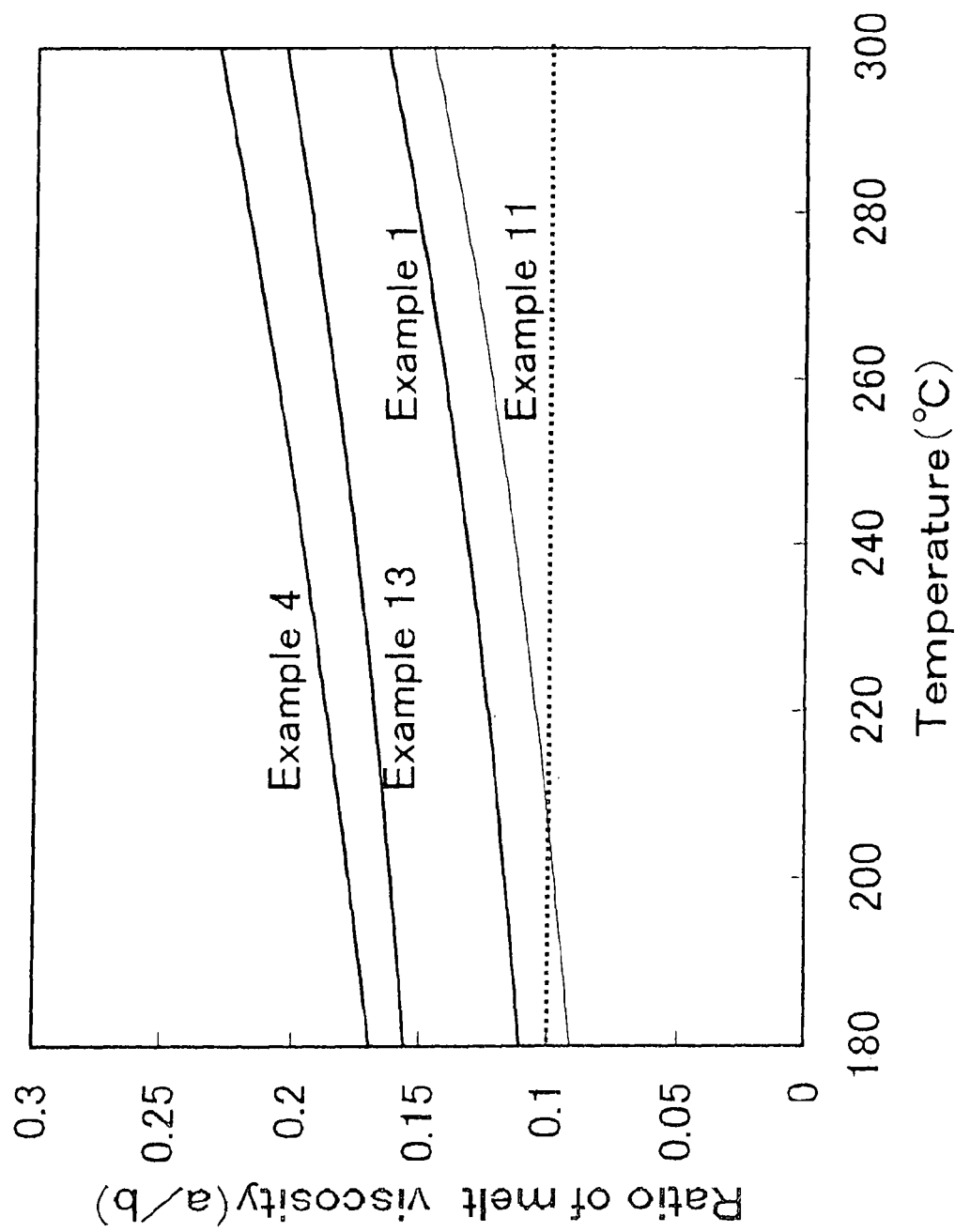
[FIG. 4] is a graph showing how the ratio of the melt viscosity of the styrene-based resin (A) to that of the thermoplastic resin other than styrene-based resins (B) in the working examples, 1, 4, 11 and 13 was affected by the temperature, based on the results obtained in FIGS. 1 and 2.

The invention claimed is:

1. A melt blended styrene-based resin composition comprising (A) a styrene-based resin, (B) a thermoplastic resin other than styrene-based resins, (c1) a modified styrene-based polymer containing vinyl-based monomer units respectively containing at least one kind of a functional group selected from the group consisting of an epoxy group and an oxazoline group, and (c2) a polycarbonate-based graft polymer, wherein the styrene-based resin (A) and the thermoplastic resin other than styrene-based resins (B) have a co-continuous structure with a wavelength of concentration fluctuation of 0.001 to 1 μm or a dispersed structure with a distance between particles of 0.001 to 1 μm, wherein the melt blended styrene-based resin composition is formed via melt blending at a resin pressure kept at 2.0 MPa to 5.0 MPa at least at one or more places in the melt blending space or temporarily during the melt blending period of time.

2. The melt blended styrene-based resin composition, according to claim 1, wherein the styrene-based resin (A) and the thermoplastic resin other than styrene-based resins (B)

have a co-continuous structure with a wavelength of concentration fluctuation of 0.01 to 0.5 μm or a dispersed structure with a distance between particles of 0.01 to 0.5 μm.

3. The melt blended styrene-based resin composition, according to claim 1, wherein the polycarbonate-based graft polymer (c2) contains a polycarbonate resin segment and a vinyl-based polymer segment.

4. The melt blended styrene-based resin composition, according to claim 1, wherein the styrene-based resin (A) contains styrene-based monomer units respectively substituted by an alkyl group with 1 to 4 carbon atoms.

5. The melt blended styrene-based resin composition, according to claim 1, wherein the thermoplastic resin other than styrene-based resins (B) is (b) a polycarbonate resin.

6. The melt blended styrene-based resin composition, according to claim 5, wherein said polycarbonate resin (b) contains an aromatic copolymerized polycarbonate obtained by copolymerizing (b1) 2,2'-bis(4-hydroxyphenyl)propane and (b2) at least one bifunctional phenol-based compound selected from 2,2'-bis(4-hydroxy-3,5-dimethylphenyl)propane, 2,2'-bis(4-hydroxy-3,5-diethylphenyl)propane and 2,2'-bis(4-hydroxy-3,5-dipropylphenyl)propane.

7. The melt blended styrene-based resin composition, according to claim 1, wherein the styrene-based resin (A) and the thermoplastic resin other than styrene-based resins (B) are a combination satisfying the following formula (1) specifying the ratio of the melt viscosities of the respective resins at the temperature T(° C.) satisfying the following formula (2)

$$a/b \geq 0.1 \quad (1)$$

$$180 \leq T \leq 300 \quad (2)$$

a: Melt viscosity of the styrene-based resin (A) (temperature T° C., shear rate 1000/sec) (Pa·s)
b: Melt viscosity of the thermoplastic resin other than styrene-based resins (B) (temperature T° C., shear rate 1000/sec) (Pa·s).

8. The melt blended styrene-based resin composition, according to claim 1, wherein the styrene-based resin (A) contains (a1) 20 to 75 wt % of styrene-based monomer units, (a2) 25 to 60 wt % of vinyl cyanide-based monomer units, and (a3) 0 to 55 wt % of other vinyl-based monomer units copolymerizable with the foregoing, the total amount of (a1) through (a3) being 100 wt %.

9. A method for manufacturing the melt blended styrene-based resin composition as set forth in claim 1, comprising the step of melt-blending the styrene-based resin (A), the thermoplastic resin other than styrene-based resins (B), the modified styrene-based polymer (c1) and the polycarbonate-based graft polymer (c2), wherein said melt blending is performed with a resin pressure kept at 2.0 MPa to 5.0 MPa at least at one or more places in the melt blending space or temporarily during the melt blending period of time.

10. The method for manufacturing the styrene-based resin composition, according to claim 7, wherein the components (A), (B), (c1) and (c2) are miscible under shear flow during said melt blending, and phase separation occurs under no shear flow after discharge.

11. A molded article composed of the melt blended styrene-based resin composition as set forth in claim 1.

12. The molded article, according to claim 9, which is painted or plated.

* * * * *